United States Patent [19]
Dietrich et al.

[11] Patent Number: 5,630,070
[45] Date of Patent: May 13, 1997

[54] OPTIMIZATION OF MANUFACTURING RESOURCE PLANNING

[75] Inventors: Brenda L. Dietrich, Yorktown Heights; Robert J. Wittrock, Ossining, both of N.Y.

[73] Assignee: International Business Machines Corporation, Armonk, N.Y.

[21] Appl. No.: 108,014

[22] Filed: Aug. 16, 1993

[51] Int. Cl.⁶ .................................................. G06F 17/60
[52] U.S. Cl. .................................................. 395/208
[58] Field of Search .................. 364/401, 402; 304/401 R, 402; 395/207–208, 210

[56] References Cited

U.S. PATENT DOCUMENTS

| | | | |
|---|---|---|---|
| 4,646,238 | 2/1987 | Carlson, Jr. et al. | 364/403 |
| 4,744,026 | 5/1988 | Vanderbei | 364/402 |
| 4,744,027 | 5/1988 | Bayer et al. | 364/402 |
| 4,885,686 | 12/1989 | Vanderbei | 364/402 |
| 4,924,386 | 5/1990 | Freedman et al. | 364/402 |
| 5,053,970 | 10/1991 | Kurihara et al. | 364/468 |
| 5,093,794 | 3/1992 | Howie et al. | 364/468 |
| 5,101,352 | 3/1992 | Rembert | 364/401 |
| 5,140,537 | 8/1992 | Tullis | 364/578 |
| 5,148,370 | 9/1992 | Litt et al. | 364/468 |
| 5,155,679 | 10/1992 | Jain et al. | 364/402 |
| 5,172,313 | 12/1992 | Schumacher | 364/401 |
| 5,185,715 | 2/1993 | Zikan et al. | 364/807 |
| 5,216,593 | 6/1993 | Dietrich et al. | 364/402 |

FOREIGN PATENT DOCUMENTS

| | | |
|---|---|---|
| 0364090 | 8/1989 | European Pat. Off. |
| 0517953A2 | 12/1991 | European Pat. Off. |

OTHER PUBLICATIONS

"Molp with an Interactive Assessment of a Piecewise Linear Utility Function", Jacquet–Lagreze et al, European Journal of Operational Research, vol. 31, 1987, pp. 350–357.

"A Hybrid Approach to Multi–Objective Linear Optimization", Poh et al., Journal of the Operational Research Society, vol. 41, No. 11, 1990, pp. 1037–1048.

"A Weighted–Gradient Approach to Multi–Objective Linear Programming Problems Using the Analytic Hierarchy Process", Arbel, Mathematical and Computer Modelling, vol. 14, No. 4/5, 1993, pp. 27–39.

"Determination of the Crop Mix of a Rubber and Oil Plantation—A Programming Approach", Tan et al., European Journal of Operational Research, vol. 34, 1988, pp. 362–371.

*Primary Examiner*—Gail O. Hayes
*Assistant Examiner*—Charles Kyle
*Attorney, Agent, or Firm*—Perman & Green

[57] ABSTRACT

A method for constrained material requirements planning, optimal resource allocation, and production planning provides for an optimization of a manufacturing process by designating the amounts of various manufactured products to be produced, which products include both end products as well as subassemblies to be employed in the manufacture of one or more of the end products. In order to accomplish the optimization, the method employs an objective function such as the maximization of income in a situation wherein there are limitations on the inventory of raw materials and tools to be employed in the manufacturing process. Data describing elemental steps in the manufacturing process for the production of each end product, as well as the quantity or demand for each end product which is to be supplied, are presented as a set of linear mathematical relationships in matrix form to be inserted in a computer which determines the optimum number of each end product in accordance with an LP optimization algorithm. The matrix contains bill of material data, and various constraints such as a constraint on the sum of products shipped and used as subassemblies, and constraints based on inventory, on available time for use of resources such as tools, and on inventory left over from an early production run for a later run.

23 Claims, 6 Drawing Sheets

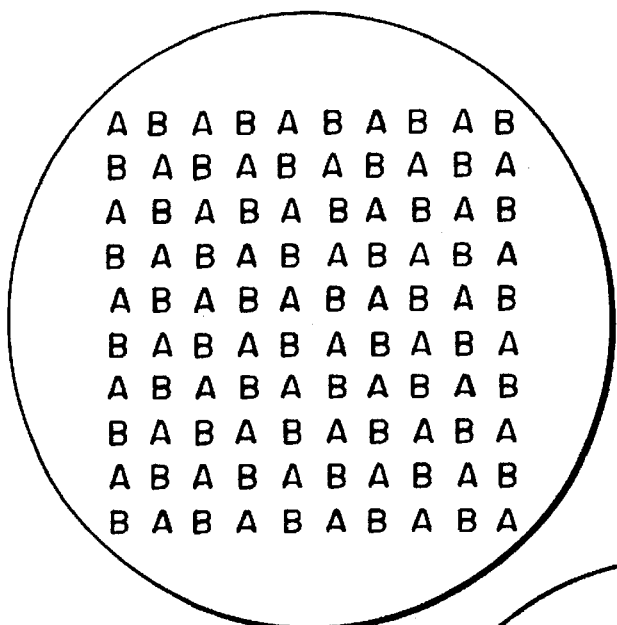
FIG. 2.
FIG. 3.
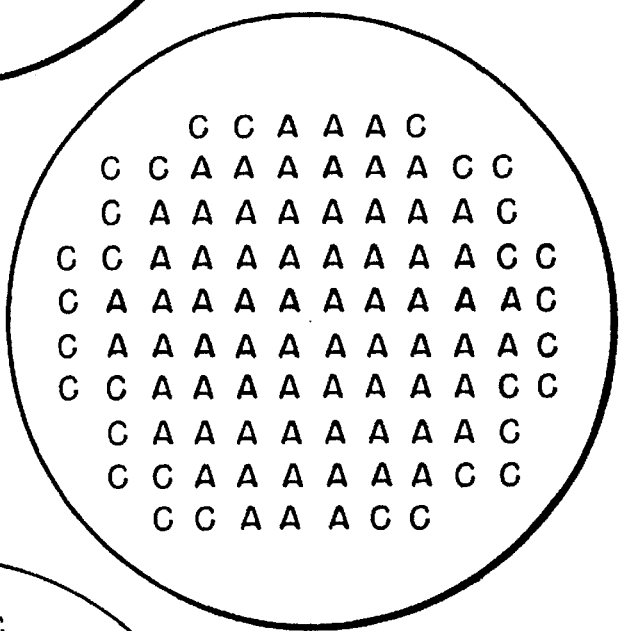
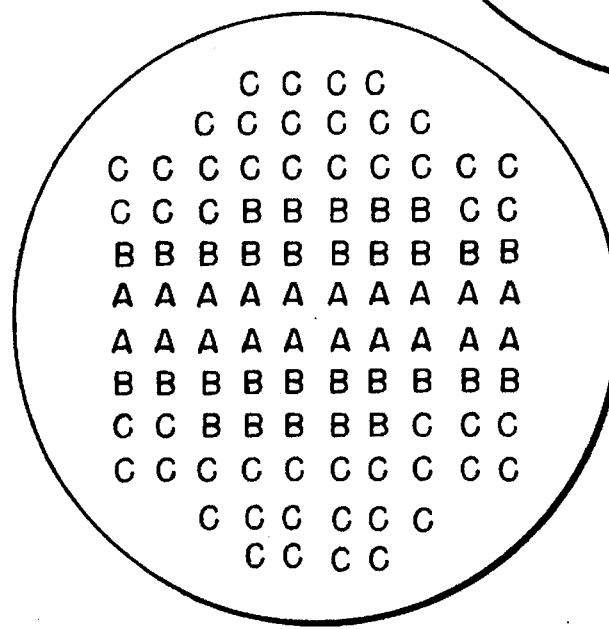
FIG. 4.

OPTIMIZATION OF MANUFACTURING RESOURCE PLANNING

BACKGROUND OF THE INVENTION

This invention relates to methodology for optimization of manufacturing resource planning (MRP), including resource allocation and production planning, by linear programming and, more particularly, to optimization of MRP for a multiple level assembly process by use of an optimal resource allocation procedure to determine shipment and production schedules, these schedules to be included in data of the MRP process.

A need for resource allocation decisions arises in a broad range of technological and industrial areas such as the assignment of transmission facilities in telephone transmission systems, the control of the product mix of a factory, the deployment of industrial equipment, and inventory control, by way of example. Resource allocation in this context means, in general, the deployment of specific technological or industrial resource for the production of particular technological or industrial results.

Resource allocation decisions are typically subject to constraints such as limitations in availability of materials, equipment, time, cost, and other parameters affecting the outcome of a technological process, as well as the utility of a particular resource in a particular application. As an example of particular interest herein, there is need to optimize the MRP for production of products, such as semiconductor devices, particularly in a situation wherein plural intermediate products must be formed first during various time frames for subsequent combination to provide the end product. Each particular allocation of resources can be associated with a specific result such as the cost or number of products produced. Ideally, resources should be allocated so as to satisfy all of the constraints and, simultaneously, to maximize a resulting benefit, such as by minimizing the costs or by maximizing the number of devices outputted by a manufacturing process.

One method of representing such allocation decision problems is known as a linear programming model. Such a model consists of a number of linear relationships, set forth in matrix format, and representing quantitatively the relationships among allocations, constraints and results of an industrial or other technological process. In the linear relationships, there is provided the sum of constant coefficients multiplied by unknown allocation values. While many resource allocation problems are not represented by such linear relationships, but involve higher powers or other nonlinear expression of equation variables, the optimization of MRP processes has been treated by a linear model. Such modeling by linear programming (LP) is accomplished in multidimensional space with multidimensional vectors providing a multidimensional figure, or polytope, wherein each facet on a surface thereof is bounded by equations defining relationships among allocated inputs to the industrial process. An optimum solution to the LP problem has been obtained by use of the Simplex algorithm developed by George Dantzig in 1947, by way of example, or by the more recent Karmarkar algorithm, as disclosed in U.S. Pat. No. 4,924,386 of Freedman et al.

A problem arises in that present systems and methodology for processing MRP procedures are limited to a prediction of the amount of products, such as semiconductor devices, to be outputted from a manufacturing facility for a given set of input parameters, such as amounts of various raw materials, available equipments and available time, for a succession of manufacturing steps. The presently available systems and methodology are unable to perform an optimization process for MRP, based on a linear objective function such as minimization of cost or maximization of the number of outputted devices. Thus, at the present time, a manufacturer can guess at a possible set of input parameters which might produce a near optimum result, and apply this to an MRP system which would predict the outcome. But there are no assurances that the predicted outcome would be near optimum.

The need for a method of optimizing a manufacturing process can be appreciated by considering the large worldwide market for manufacturing information systems (MIS) which contain data and data-processing methods that aid manufacturing managers in production planning and execution. For example, an MIS contains demand data, supply data, cost data, and bill-of-material data, and includes MRP software, capacity requirements planning (CRP) software, order-tracking software, and financial-reporting software. The market for just MRP is in the billions of dollars. MIS software is available for computers ranging from mainframes to desktops.

Presently available MIS is directed primarily to data management systems. Most important manufacturing decisions (for example, what to make, how much to make, when and where to make it) are ultimately made by humans rather than by an MIS. Typically, a manufacturer uses intuition and experience together with knowledge about manufacturing capacity and market demand to determine an initial production plan. Then the manager would run MRP and/or CRP to produce reports describing inconsistencies between a production plan and availability of a resource. This would be followed, possibly, by a revision of the production plan with a rerun of the MRP and the CRP. This is time consuming, and the reports are difficult to interpret for purposes of revising a production plan so as to alleviate a shortage of a particular material employed in the production process. An attempt to run an infeasible production plan can result in missed customer shipments, excess raw material inventory, long cycle times, production bottlenecks, poorly utilized capacity, and idle workers. Even when the production plan is feasible, the manufacturer must deal with the lengthy process of manually revising the production plan until receipt of a report from MRP and CRP indicating no shortages. The process can result in poor resource allocation decisions, such as the allocation of scarce resources to low profit products.

The limitations of presently available MRP result in a common manufacturing problem which is a shortage of raw material or subassemblies. For example, in the situation wherein a manufacturer has more orders than can be filled, the manufacturer would like to fill the orders in a manner which would maximize the profit, or which would minimize the inventory, or would meet some other goal.

SUMMARY OF THE INVENTION

The aforementioned problem is overcome and other advantages are provided by a method which provides for constrained material requirements planning, optimal resource allocation, and production planning. In accordance with the invention, the optimization of a manufacturing process is accomplished by designating the amounts of various manufactured products to be produced, which products include both end products as well as subassemblies to be employed in the manufacture of one or more of the end products, so as to meet an objective function such as the maximization of income in a situation wherein there are limitations on the inventory of raw materials and tools to be employed in the manufacturing process.

The invention is employed readily in numerous manufacturing processes, one such process of considerable interest, by way of example, being the manufacture of semiconductor circuit devices wherein various circuit components in the form of chips are to be fabricated, as by photolithography, to be combined upon a common substrate to produce the desired device. The wafers, upon which the chips are fabricated, may have various types of chip structures thereon, which chip structures are to be selected and connected together upon the common substrate to produce a desired end product. It is assumed that a variety of end products may be produced by selection and interconnection or various ones and types of the chips. The manufacturing process employs, by way of example, a variety of raw materials including silicon wafers and various dopants which are to be applied to the silicon to become a component of an end product. In the photolithographic steps, various etchants and photoresists are employed to shape doped regions; the etchants and the photoresists are materials which are consumed in the photolithographic steps and do not normally appear in the end products. The manufacturing process also includes resources such as vacuum chambers for deposition of the etchants, dopants and the photoresists, ovens for baking the wafer subassemblies during various stages of the manufacture, steppers for repetitively placing optical images upon a wafer, and slicing apparatus for extracting various chips, as subassemblies, from completed wafers to be combined into one or more of the end products.

It has been the practice to establish a bill of materials (BOM) including materials such as the silicon, the etchants, the photoresists and the dopants which constitute an inventory of materials needed in the manufacturing process. It has also been the practice to establish a bill of resources (BOR) including resources such as the vacuum chambers, the ovens, the steppers, and the slicers which constitute an inventory of resources needed for the manufacturing process. In the event that there is adequate inventory of both materials and resources to provide as much of the end products as may be desired, it has been the practice to employ an MRP to check how much of each material and resource is required for a production run, thereby to insure that there is adequate inventory, and to facilitate reorder of materials and pricing of the end products.

The invention is directed to the situation in which there is insufficient inventory of one or more of the materials, and possibly a lack of the requisite number of one or more of the resources, needed to accomplish the production run. In this situation, the constraints of inventory restrict the manufacturing process such that only a fraction of the desired numbers of the various end products can be produced. This forces the manufacturer to make a decision with respect to allocation of the available material and resources to provide the optimum number of each end product, with the optimization being done in accordance with some objective function. As an example of objective function, a manufacturer frequently selects maximization of income or profit as the basis for optimizing the manufacturing process under the constraint of insufficient inventory. Instead of performing the optimization by heuristic methods, as has been done in the past, the invention provides a method for definitively establishing, in a mathematical sense, the necessary amount of each of the end products to be produced to meet the objective function in the presence of the inventory constraints.

In accordance with the invention, data describing elemental steps in the manufacturing process for the production of each end product, as well as the quantity or demand for each end product which is to be supplied, are presented as a set of linear mathematical relationships in matrix form to be inserted in a computer which determines the optimum number of each end product in accordance with an LP optimization algorithm such as the aforementioned Simplex, as implemented by well-known commercially available OSL or MPSX programs in the practice of a preferred embodiment of the invention, or by the aforementioned Karmarkar algorithm. The results of the optimization are then incorporated with other manufacturing data generally found in an MRP to enable a manufacturer to determine an optimal shipping schedule, the corresponding production schedule, as well as a part usage schedule.

In accordance with a feature of the invention, the matrix contains: (1) BOM data in the situation wherein a lack of material inventory provides a constraint, (2) a statement in the form of a constraint for each end product that the sum of the quantity of an end product supplied plus the quantity of the end product employed as a subassembly cannot exceed the quantity of the end product which may be available from inventory plus the quantity produced in the manufacturing process, (3) a statement in the form of a constraint for each product, including subassemblies, that the quantity of a product supplied cannot exceed the quantity of the product which may be available from inventory plus the quantity produced in the manufacturing process, (4) a statement in the form of a constraint for each product that the quantity of a product to be shipped cannot exceed the quantity which is desired, and (5) production of each product and shipment of each product cannot be less than zero. This matrix is referred to as the A matrix. Also, on the right hand side of the A matrix is a vector, referred to as the b vector, containing data as to the amount of items, both end products and raw materials, in inventory plus the demand for each end product. The foregoing contents of the A matrix and the b vector reflect a simple situation wherein there are adequate resources so that there is no resource constraint. In the case wherein a lack of resources imposes a constraint, then there are additional statements including BOR data and constraints in the use of the resources, such as the amount of time available for use of a resource.

BRIEF DESCRIPTION OF THE DRAWING

The aforementioned aspects and other features of the invention are explained in the following description, taken in connection with the accompanying drawing wherein:

FIGS. 2, 3 and 4 are a diagrammatic plan views of three different wafers produced in the manufacture of FIG. 1, the views of FIGS. 2, 3 and 4 showing locations and identities of various chips formed within the wafer;

DETAILED DESCRIPTION

Figure 1:
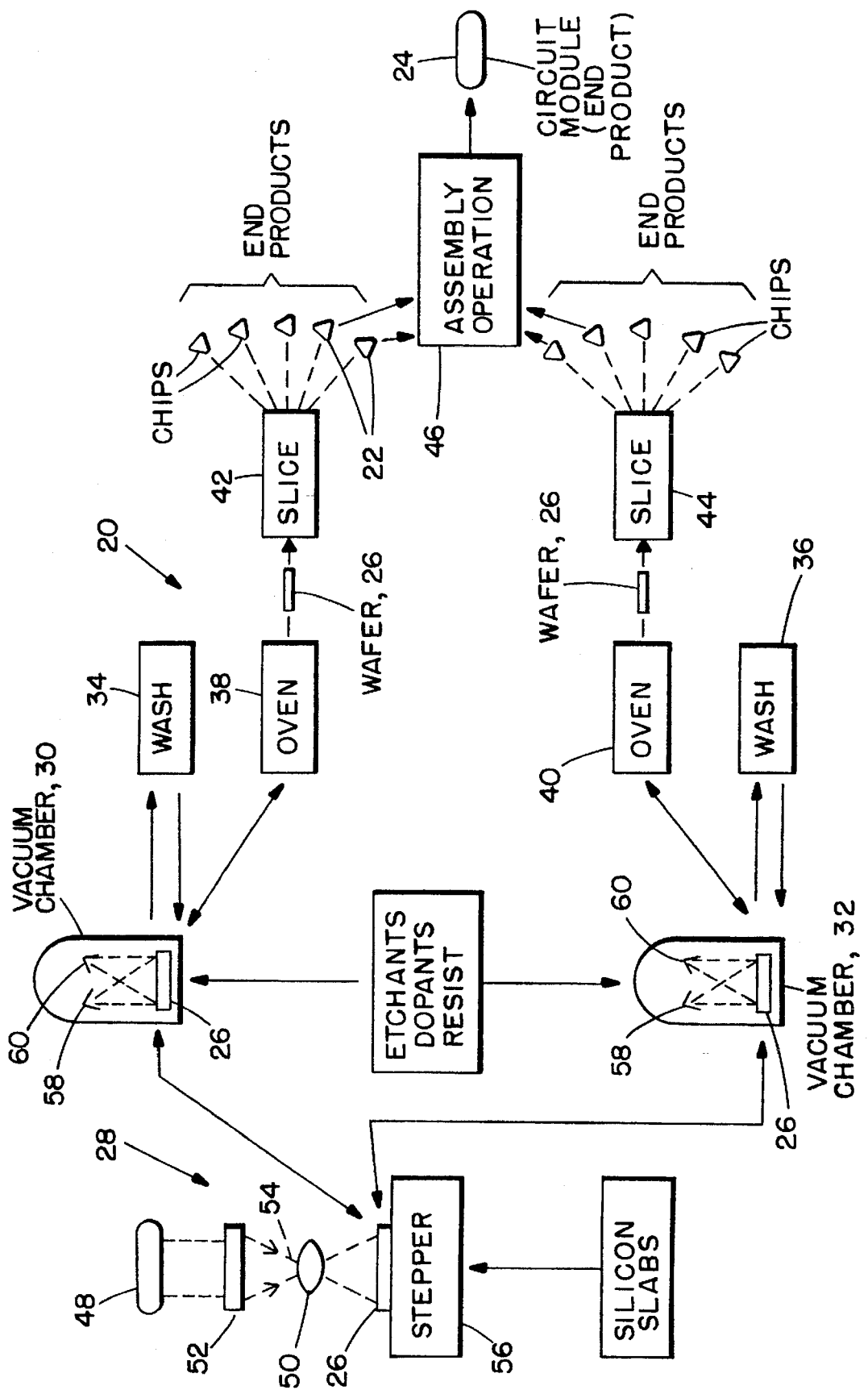
FIG. 1 shows a simplified diagram of a manufacturing process producing semiconductor circuit products wherein a choice of the quantities of the various end products, based on constrains of available inventory of raw materials and available manufacturing tools, is to be made based on the procedures of the invention.

FIG. 1 shows a manufacturing system 20 for producing end products in the forms of various chips 22, and circuit modules 24 such as microprocessors from raw materials such as slabs of silicon upon which wafers 26 are constructed with the aid of etchants, dopants and photoresist. By way of example, the system 20 comprises a photolithographic station 28, two vacuum chambers 30 and 32, two wash stations 34 and 36, two ovens 38 and 40, two slicing stations 42 and 44, and an assembly station 46. The photolithographic station 28 includes a lamp 48 and a lens 50 whereby light emitted by the lamp 48 passes through a film plate 52 to be focussed by the lens 50 to image subject matter of the film plate 52 upon a wafer 26. The light is indicated by rays 54. Also included in the station 28 is a stepper 56 for introducing relative displacement between the film plate 52 and the wafer 26 for repetitively imaging the subject matter of the film plate 52 upon the wafer 26. Each of the vacuum chambers 30 and 32 has apparatus for the sputtering or chemical vapor deposition, by way of example, of various materials, such as the sources 58 and 60 of materials including etchants, dopants and photoresist to be used in the manufacture of a wafer with its chips 22.

In operation, silicon slabs are inputted to the system 20, are coated with photoresist at one of the vacuum chambers 30 or 32, are transported to the stepper 56 to be exposed to the light for production of images in the photoresist. In further steps of the manufacture, the wafers are transported among the wash stations 34, 36, the vacuum chambers 30, 32 and the photolithographic station 28 to accomplish well-known semiconductor circuit fabrication steps such as the washing away of exposed photoresist, the deposition of dopants, further deposition of resist and exposure to lithography, and etching away of portions of layers of materials deposited in the vacuum chambers 30 and 32. Manufacturing steps requiring heating for a prescribed interval of time are accomplished by transporting the wafers 26 to one of the ovens 38 and 40. Upon completion of the construction of a wafer 26, the wafer 26 is transported to one of the slicing stations 42 or 44 to separate the various chips 22, some of which are dispensed directly as end products, and other ones of which serve as subassemblies to be employed in the assembly of a module 24.

To facilitate demonstration of the invention, the system 20 is portrayed partially in two channels which share a common photolithographic station 28 and a common assembly station 46. Thus, there is a time sharing of the stepper 56 among wafers 26 produced by the upper channel comprising the chamber 30, the oven 38 and the slicing station 42, and wafers 26 produced by the lower channel comprising the chamber 32, the oven 40 and the slicing station 44. While two wash stations 34 and 36 are shown, respectively, in the upper channel and the lower channel, it is possible, alternatively, to construct the system 20 with a single wash station shared between the two channels. Implementation of the invention takes into account a time sharing of resources between the two channels so as to meet an objective function such as minimization of cost or maximization of income. The use of the two channels is convenient for operation of the assembly station 46 by bringing simultaneously chips 22 of the upper and the lower channels to facilitate the assembly process, and to minimize production time for the modules 24.

Figure 5:
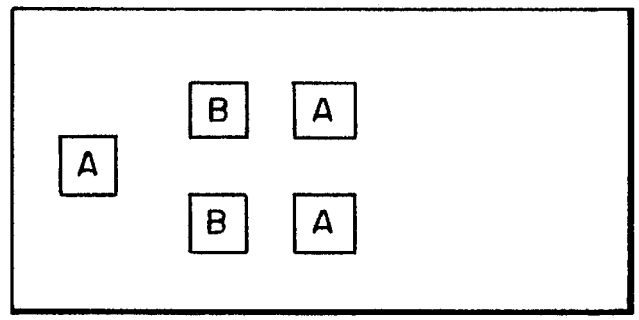
FIG. 5 is a diagram of a circuit module in the form of a relatively fast microprocessor produced in the manufacture of FIG. 1.
Figure 6:
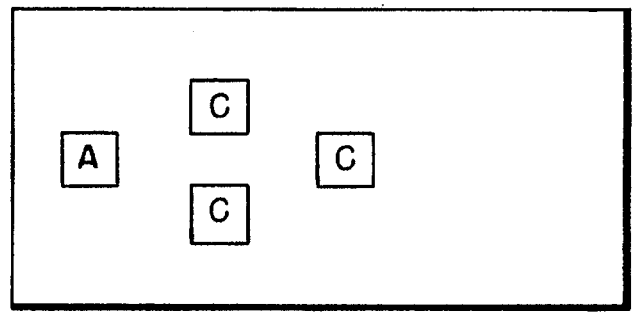
FIG. 6 is a diagram of a circuit module in the form of a relatively slow microprocessor produced in the manufacture of FIG. 1.

FIGS. 2, 3 and 4 show diagrammatically various configurations of the wafers 26 to be produced by the system 20. The wafer shown in FIG. 2 may be designated as type AXB and is constructed of fifty type-A chips and fifty type-B chips, by way of example, at a cost of $1100/wafer. The wafer shown in FIG. 3 may be designated as type AXC and is constructed of seventy type-A chips and thirty type-C chips, by way of example, at a cost of $1300/wafer. The type-A chip operates at a relatively fast speed, as compared to the type-C chip which operates at a relatively slow speed, and the type-B chip operates at a medium speed. The wafer shown in FIG. 4 may be designated as type ABC and is constructed of twenty type-A chips, thirty type-B chips, and fifty type-C chips, by way of example, at a cost of $1500/wafer. FIG. 5 shows a relatively fast operating configuration of the circuit module 24 which may be designated as product P1, and which is composed of type-A and type-B chips. FIG. 6 shows a relatively slow operating configuration of the circuit module 24 which may be designated as product P2, and which is composed of type-A and type-C chips. The various items, such as the chips and the wafers, are often referred by a part number, or simply p/n.

The operation of the invention will be explained hereinafter by a mathematical description. However, in order to facilitate explanation of the invention, a manufacturing operation simpler than that of the foregoing semiconductor circuit fabrication will be presented. Accordingly, the ensuing description makes reference to a restaurant producing various forms of omelets and sandwiches from a limited inventory of raw ingredients consisting of peppers, mushrooms, butter, eggs, ham, cheese and bread. Also included in the inventory, by way of example, are a few plain sandwiches each of which consists of two slices of bread, and a single previously prepared cheese sandwich. The quantities of the various ingredients and the selling prices of the various products are presented in the following description. In order to make an analogy between the production of omelets and sandwiches with the foregoing manufacture of semiconductor circuits, it will be assumed that a plain omelet can be served directly to a customer, or that the plain omelet can serve as a subassembly in the production, or manufacture, of a more complex omelet, such as a cheese omelet wherein further preparation cooking time is employed to incorporate the cheese. Similar comments apply to other more complex types of omelets and to the various forms of sandwiches as will be described.

Upon completion of the description of the preparation of the various omelets and the sandwiches, the description continues with the arrangement of the various raw materials plus inventory constraints, and other constraints of the invention, within a matrix format for insertion into a computer to perform LP optimization. The optimization attains the numbers, or quantities of the various omelets and sandwiches which meet an objective function, herein in this example, a maximization of income to the restaurant. Further examples are given to demonstrate constraints due to lack of a sufficient number of restaurant tools such as toasters and skillets, and also to demonstrate the procedure of the invention for the situation wherein the preparation of the food extends over two intervals of time, such as early and late lunch, wherein there may be a delivery of raw ingredients after the early lunch to supplement the inventory left over from the early lunch. This is then followed by the mathematical description.

In the ensuing description of the preparation of food products by the restaurant, tabulated data for the various forms of the omelets and the sandwiches will be presented in a set of tables wherein Table 1 presents the cost or selling price for each food item outputted by the manufacturing process, as well as recipes for each food item. The recipes are set forth in a format analogous to a manufacturing process employing raw materials plus previously completed subassemblies. For example, the vegetable omelet is described as being composed of raw materials, namely two ounces of mushrooms and two ounces of green peppers, plus a single subassembly, namely one plain omelet. To calculate the total amount of raw materials consumed in the production of the vegetable omelet, one must consider both the raw materials listed in the recipe plus the raw materials employed in producing the subassembly of the plain omelet; this gives two ounces of mushrooms, two ounces of green peppers, three eggs, and one teaspoon of butter. Such a break-out of the amounts of all of the raw materials employed in production of an end product, often referred to as an explosion in the language of MRP, is employed in listing the total amount of each ingredient, or raw material, as will be described with reference to Table 4, to meet the demands by customers for various food products as set forth in Table 2.

For example, Table 2 shows that the customers have ordered six of the vegetable omelets. Accordingly, the foregoing quantities of each of the four ingredients of the vegetable omelet would be multiplied by six to obtain the total amount of raw materials employed in meeting the customer demand for vegetable omelet. Similar calculations would be employed for each of the other food products, and the results are to be summed together to give a grand total of the quantities of the raw materials of all the demanded food products. In the event that the restaurant has a cheese sandwich left over from a previous production run, which sandwich is to be used to meet the present customer demand, then the total amount of raw materials required for the present production run can be reduced by the amount in the left-over cheese sandwich. Similarly, if there were left-over plain sandwiches (just two slices of bread per sandwich), the amount of bread required to meet the customer demand would be reduced by the amount of bread in the plain sandwiches. Table 3 lists the inventory available to the cook at the beginning of the production run. As will be seen in the following example, there is an insufficiency, or shortage, for each ingredient except for mushrooms wherein there is an excess, as indicated in Table 5. Note that, in Table 5, the amount of the shortage of mushrooms is shown as zero to avoid the appearance of negative amounts in the ensuing mathematical explanation. The example of the restaurant is as follows.

In order to illustrate the differences between standard MRP and constrained production planning, there is provided the following relatively simple example. A cook makes 2 types of foods, omelets and sandwiches. He makes 5 types of omelets and 5 types of sandwiches, using a total of 7 ingredients (eggs, bread, butter, ham, cheese, peppers and mushrooms). He has a set of customer orders for his omelets and sandwiches and a fixed set of ingredients on hand. The receipts, and the selling price of his products are shown in Table 1.

Figure 7:
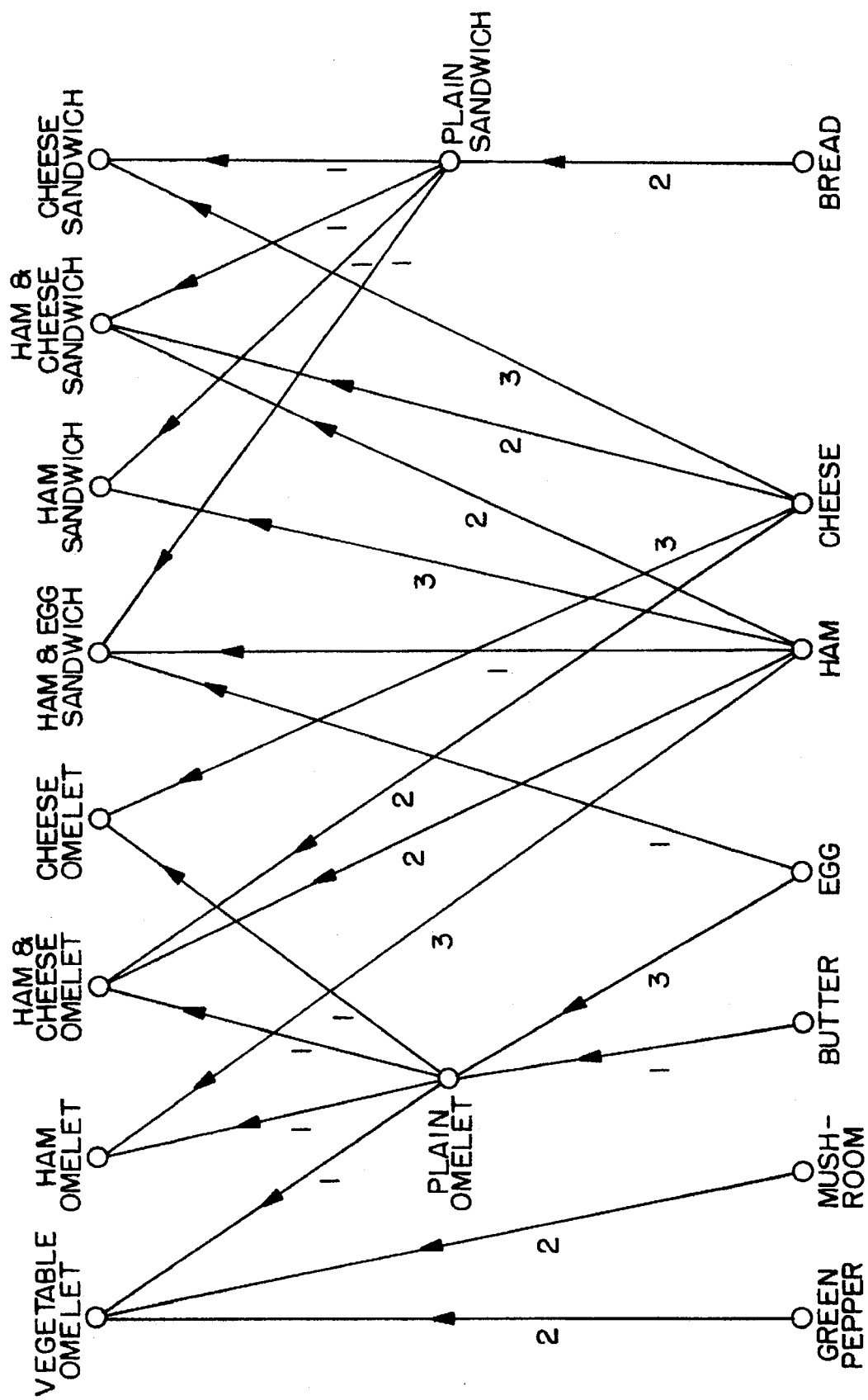
FIG. 7 is a graph showing utilization of raw materials in the production of subassemblies and end products as well as the use of the subassemblies in production of the end products.

The "bill of materials" for his products is represented pictorially in FIG. 7. The numbers on the arc represent usage rate.

Table 2 gives demand, Table 3 gives inventory. Note that the cook has some finished goods inventory (1 cheese sandwich) and some subassembly inventory (3 plain sandwiches). Table 4 gives the total requirements for the raw ingredients (subassembly and finished goods stock are netted). Table 5 gives the net requirements for the raw ingredients. The information in Table 5 is the usual output of MRP. It tells the manufacturer what additional materials are required in order to meet the end product demand.

TABLE 1

| Plain omelet | $2.00 | Plain sandwich | $1.00 |
| 3 eggs | | 2 slices bread | |
| 1 tsp butter | | | |
| Cheese omelet | $3.00 | Cheese sandwich | $1.50 |
| 1 plain omelet | | 1 plain sandwich | |
| 3 oz. cheese | | 3 oz. cheese | |
| Ham omelet | $3.50 | Ham sandwich | $2.50 |
| 1 plain omelet | | 1 plain sandwich | |
| 3 oz. ham | | 3 oz. ham | |
| Ham & Cheese omelet | $4.00 | Ham & cheese sandwich | $2.50 |
| 1 plain omelet | | 1 plain sandwich | |
| 2 oz. cheese | | 2 oz. ham | |
| 2 oz. ham | | 2 oz. cheese | |
| Vegetable omelet | $2.75 | Ham & egg sandwich | $3.50 |
| 1 plain omelet | | 1 plain sandwich | |
| 2 oz. mushrooms | | 1 egg | |
| 2 oz. green pepper | | 1 oz. ham | |

TABLE 2

| Demand | |
| --- | --- |
| Plain omelet | 2 |
| Cheese omelet | 4 |
| Ham omelet | 5 |
| Ham & cheese omelet | 2 |
| Vegetable omelet | 6 |
| Plain sandwich | 0 |
| Cheese sandwich | 4 |
| Ham sandwich | 3 |
| Ham & cheese sandwich | 5 |
| Ham & egg sandwich | 4 |

TABLE 3

| Inventory | |
| --- | --- |
| Plain sandwich | 3 |
| Green pepper | 10 oz. |
| Mushroom | 14 oz. |
| Butter | 15 oz. |
| Eggs | 40 |
| Ham | 30 oz. |
| Cheese | 30 oz. |
| Bread | 20 slices |
| Cheese sandwich | 1 |

TABLE 4

| Total Requirements for raw ingredients | |
| --- | --- |
| Green pepper | 12 oz. |
| Mushroom | 10 oz. |
| Butter | 19 tsp. |
| Eggs | 61 |
| Ham | 42 oz. |
| Cheese | 35 oz. net 35 (1 cheese sand. invent.) |
| Bread | 24 slices - 24 (net 3 plain sand. invent.) |

TABLE 5

Net Requirements (shortages)

| | |
|---|---|
| Green pepper | 2 oz. |
| Mushrooms | 0 (excess inventory) |
| Butter | 4 tsp. |
| Eggs | 21 |
| Ham | 12 oz. |
| Cheese | 5 oz. |
| Bread | 4 slices |

The invention deals with a constrained production planning problem. It is an object of the invention to determine the quantity to produce of each type of omelet and sandwich. The methodology of the invention is explained, in terms of the foregoing working situation as follows. The mathematical formulation of this problem requires 10 decision variables.

We define:

$X_1$=number of plain omelets to produce $x_2$=number of cheese omelets to product $x_3$=number of ham omelets to produce $x_4$=number of ham and cheese omelets to produce $x_5$=number of vegetable omelets to produce $x_6$=number of plain sandwiches to produce $x_7$=number of cheese sandwiches to produce $x_8$=number of ham sandwiches to produce $x_9$=number of ham and cheese sandwiches to produce $x_{10}$=number of ham and egg sandwiches to produce The mathematical formulation of this problem requires 9 material balance constraints, one for each of the 7 raw ingredients (eggs, butter, mushrooms, peppers, ham, cheese, bread) and one for each of the two "subassemblies" (plain omelet, plain sandwich). The formulation is presented in two sets of constraints, set forth in equation sets (1) and (2).

Equation set (1) has nine lines corresponding to the nine constraints. The variables to the left of the inequality sign are arranged so that variables representing the same food product in a plurality of the lines appear in the same column. The column of variables to the right of the inequality signs are recognized as being the inventory of Table 3. The first seven lines relate to the seven raw food ingredients of the inventory, and the last two lines relate to the two subassemblies (plain omelet and plain sandwich) of the inventory. In the first ten columns of variables from the left, each column represents a specific one of the food products to be manufactured as listed in Table 1. Also, the first seven row elements of each column, presents the ingredients, exclusive of any required subassembly, for producing the food product. The coefficient for each variable designates the quantity of the food product to be employed in accordance with the recipes of Table 1. The first column of variables at the left side of the equation set discloses, in its first seven row elements, the amount of eggs and butter to be employed in making a single plain omelet. The second column of variables from the left discloses, in its first seven row elements, the amount of cheese to produce a single cheese omelet. In similar fashion, the remaining ones of the first ten columns from the left, in their respective first seven row elements, disclose ingredients for the remaining food products of Table 1.

The eighth row of equation set (1) deals with the constraint that the sum of all plain sandwiches employed in subassemblies minus the amount of plain sandwiches produced must not exceed inventory. The ninth row, which includes an entry (to be described hereinafter) in the eleventh column from the left, deals with the constraint that the sum of all plain omelets employed in subassemblies plus the amount of plain omelets eaten directly minus the amount of plain omelets produced must not exceed inventory.

With respect to equation set (2), it is noted that in the production of any one of the foregoing ten food products of Table 1, the number produced cannot be less than zero. This presents a set of non-negativity constraints for production of the food products which are set forth in equation set 2. The variables representing the respective food products are set forth individually in separate lines of the equation set, and are arranged in columnar form corresponding to the columns of equation set 1.

$$
\begin{array}{lllllllllll}
3X_1 & & & & & & & & +x_{10} & \leq 40 \text{ (eggs)} & (1)\\
& & & & 2x_5 & & & & & \leq 10 \text{ (gr. pepper)} & \\
& & & & 2x_5 & & & & & \leq 14 \text{ (mushrooms)} & \\
x_1 & & & & & & & & & \leq 15 \text{ (butter)} & \\
& & 3x_3 & +2x_4 & & & +3x_8 & +2x_9 & +x_{10} & \leq 30 \text{ (ham)} & \\
& 3x_2 & & +2x_4 & & +3x_7 & & +2x_9 & & \leq 30 \text{ (cheese)} & \\
& & & & & 2x_6 & & & & \leq 20 \text{ (bread)} & \\
& & & & & -x_6 & +x_7 & +x_8 & +x_9 & +x_{10} & \leq 3 \text{ (plain sand)} \\
-x_1 & +x_2 & +x_3 & +x_4 & +x_5 & & & & & +s_1 & \leq 0 \text{ (plain omelets)}\\
\end{array}
$$

$$
\begin{array}{ll}
x_1 & \geq 0 \qquad (2)\\
x_2 & \geq 0\\
x_3 & \geq 0\\
x_4 & \geq 0\\
x_5 & \geq 0\\
x_6 & \geq 0\\
x_7 & \geq 0\\
x_8 & \geq 0\\
x_9 & \geq 0\\
x_{10} & \geq 0\\
\end{array}
$$

These two sets of constraints describe the set of all possible combinations of products that can be made with the available ingredients. Note that these constraints permit combinations that are inconsistent with the product demand. For example, the point $x_1$=12, $x_2$=12, $x_3$=0, $x_4$=0, $x_5$=0, $x_6$=0, $x_7$=0, $x_8$=0, $x_9$=0, $x_{10}$=0, which corresponds to making 12 cheese omelets and 12 plain omelets that are used in the cheese omelets and none of the other items, satisfies all of the material availability constraints and the non-negativity constraints. However, since the demand for cheese omelets is only 4, the point (12, 12, 0,0,0,0,0,0,0,0) is not likely to represent a good allocation of the available ingredients.

In order to restrict the formulation to include only production combinations that are consistent with the product demand, additional decision variables must be introduced, and the material availability constraints (1) must be altered to include these additional variables.

For each product that has a demand, a "shipment" variable, representing the amount of that demand that is satisfied, is required. Specifically, for this example we let:

$s_1$=number of plain omelets served
$s_2$=number of cheese omelets served
$s_3$=number of ham omelets served
$s_4$=number of ham and cheese omelets served
$s_5$=number of vegetable omelets served
$s_7$=number of cheese sandwiches served
$s_8$=number of ham sandwiches served
$s_9$=number of ham and cheese sandwiches served
$s_{10}$=number of egg and ham sandwiches served Note that $s_6$ is not needed, since there is no demand for plain sandwiches.

The material availability constraints for subassemblies that have demand (e.g., plain omelet) are altered to reflect the facts that the sum of the quantity that is served, plus the quantities that are used in other products, cannot exceed the quantity that is available from production and inventory. Thus the final equation of (1) is given by $$-x_1+x_2+x_3+x_4+x_5+s_1 \leq 0 \text{(plain omelet)}$$

For each of the end products, we add constraints that say that the amount of the produced served cannot exceed the amount of the product available from production and inventory.

$-x_2+s_2 \leq 0$ (cheese omelet)
$-x_3+s_3 \leq 0$ (ham omelet)
$-x_4+s_4 \leq 0$ (ham and cheese omelet)
$-x_5+s_5 \leq 0$ (vegetable omelet)
$-x_7+s_7 \leq 0$ (cheese sandwich)
$-x_8+s_8 \leq 0$ (ham sandwich)
$-x_9+s_9 \leq 0$ (ham and cheese sandwich)
$-x_{10}+s_{10} \leq 0$ (ham and egg sandwich)

An additional set of constraints is required to reflect the fact that one cannot serve more than has been demanded:

$s_1 \leq 2 \quad s_7 \leq 4$
$s_2 \leq 4 \quad s_8 \leq 3$
$s_3 \leq 5 \quad s_9 \leq 5$
$s_4 \leq 2 \quad s_{10} \leq 4$
$s_5 \leq 6$ Finally, the quantity of each product served must not be less than 0.

$s_1 \geq 0 \quad s_7 \geq 0$
$s_2 \geq 0 \quad s_8 \geq 0$
$s_3 \geq 0 \quad s_9 \geq 0$
$s_4 \geq 0 \quad s_{10} \geq 0$
$s_5 \geq 0$ When writing formulas such as (1)–(5) above in matrix notation, the not-negatively constraints (2) and (5) are usually not included in the matrix.

Thus we can rewrite (1)–(5) above as:

$$A \begin{pmatrix} x \\ s \end{pmatrix} \leq b$$
$$x \geq 0$$
$$s \geq 0$$

Figure 8:
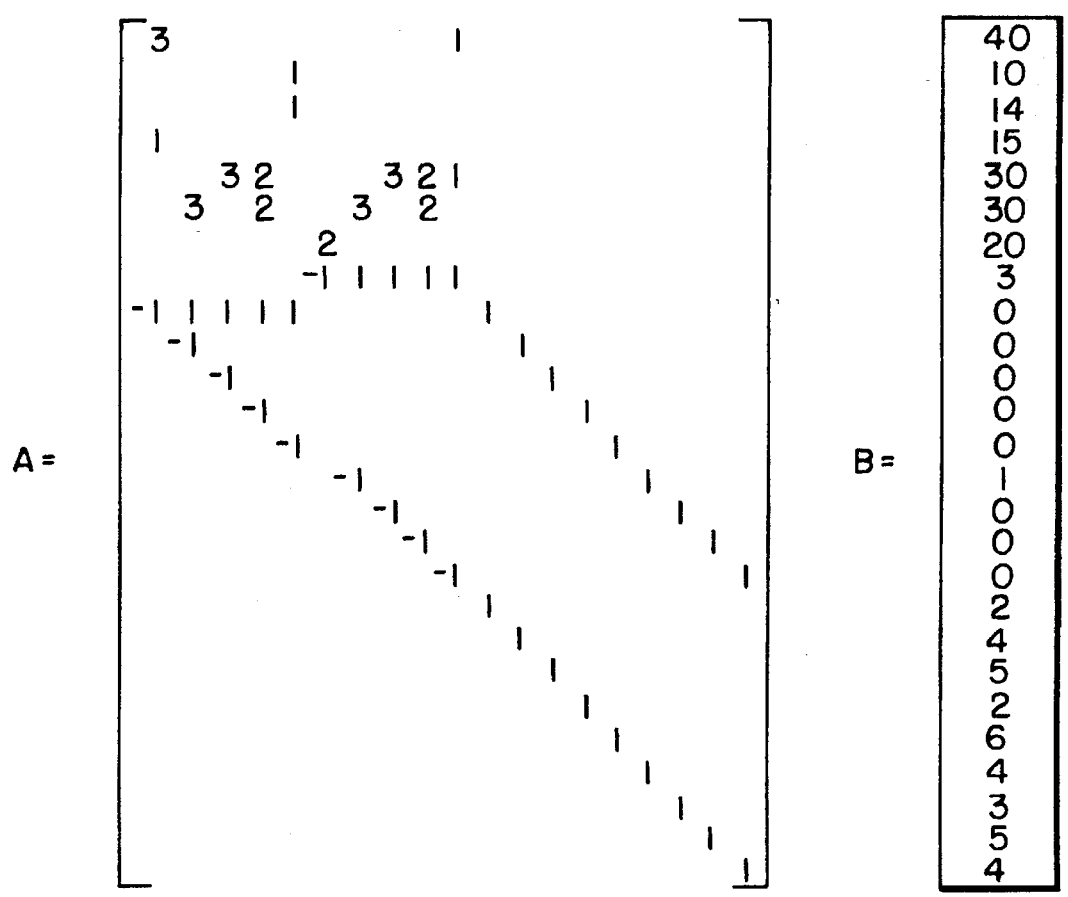
FIG. 8 shows an A matrix and a b vector which are useful in the conduct of the invention.

The A matrix and b vector are shown in FIG. 8 and represent constraints (1), (3), (4).

$x=(x_1, x_2, x_3, x_4, x_5, x_6, x_7, x_8, x_9, x_{10})$
$s=(s_1, s_2, s_3, s_4, s_5, s_7, s_8, s_9, s_{10})$

The A matrix has ten columns on the left part of the matrix for the ten components of the variable x as set forth in the equation set (1), and nine columns on the right part of the matrix for the nine components of the variable s as set forth in the equation sets (3) and (4). The coefficients of the first eight rows are the same as the coefficients of the x components as set forth in the first eight lines of equation set (1). The coefficients in the ninth row of the matrix correspond to the coefficients of the ninth line of the equation set (1) such that the coefficients of the first five columns in the ninth row of the matrix are the same as the five x coefficients of the ninth line of the equation set (1), and the coefficient of the first s column of the matrix is the same as the coefficient of the sole s component in the ninth line of the equation set (1). The entries at the right side of the inequality signs in the nine lines of equation set (1) are found in the corresponding nine places of the b vector of FIG. 8. The next eight rows (row 10 through row 17) of the A matrix have coefficients which are the same as the coefficients of the x and the s components set forth in the eight lines of equation set (3). The entries at the right side of the inequality signs in the eight lines of equation set (3) are found in the corresponding eight places of the b vector. In similar fashion, the entries in the last nine rows of the A matrix and the last nine places of the b vector correspond to the entries in the nine lines of equation set (4). Note that the upper left hand corner of A gives the bill of material, that is, if the row i corresponds to material i and the column j corresponds to the production of product j then aij (the entry in the ith row, jth column of A) is usage of material in i product j. The upper portion of the b vector corresponds to the availability of materials, while the lower portion of the b vector corresponds to demands.

The constraints (1)–(5) describe the set of all combinations of production and shipments (quantity served) that satisfy the material availability and do not exceed any demand. In order to determine which of the many possible points is "best" one needs to formulate an objective function. In this case we will use total revenue as our objective. Our goal will be to maximize revenue, that is the point (x,s) that among all points satisfying, (1)–(5) maximizes the expression:

$$2s_1+3s_2+3.5s_3+4s_4+2.75s_5+1.50s_7+2.50s_8+3.00s_9+3.50s_{10}$$

wherein the coefficients of the s components are the prices of the various food products as set forth in Table 1. We let c denote the vector (2, 3, 3.5, 4, 2.75, 1.5, 2.5, 3, 3.5) wherein the vector components are the set of prices. The problem of determining the revenue maximizing production and shipment schedule then becomes a maximizing of the dot product, namely, Max cs -continued such that $A \begin{pmatrix} s \\ x \end{pmatrix} \leq b$ for $x \geq 0$ and $s \geq 0$ This problem is a linear program, which can be solved by a variety of techniques, such as Dantzig's simplex algorithm or Karmarkar's interior point algorithm.

The optimal solution to this particular LP is:

| | |
|---|---|
| $x_1 = 12$ | $s_1 = 0$ |
| $x_2 = 4$ | $s_2 = 4$ |
| $x_3 = 1$ | $s_3 = 1$ |
| $x_4 = 2$ | $s_4 = 2$ |
| $x_5 = 5$ | $s_5 = 5$ |
| $x_6 = 10$ | |
| $x_7 = 1$ | $s_7 = 2$ |
| $x_8 = 3$ | $s_8 = 3$ |
| $x_9 = 5$ | $s_9 = 5$ |
| $x_{10} = 4$ | $s_{10} = 4$ |

Notice that this solution is feasible with respect to the inventory availability. That is, if we apply standard MRP logic to the shipment vector s, treating it as a demand, no material shortages result.

In this particular case, translating the LP solution in to an actual production plan is quite easy. A total of 12 plain omelets are made; 4 are used for cheese omelets, 1 is used for a ham omelet, 2 are used for ham and cheese omelets and 5 are used for vegetable omelets, all of which are served. No plain omelets are served. The cheese sandwich from inventory is served. A total of 10 plain sandwiches are made. These, together with the three plain sandwiches in inventory are used to make 1 cheese sandwich, 3 ham sandwiches, 5 ham and cheese sandwiches, and 4 ham and egg sandwiches, all of which are served.

Note that a total of 40 eggs are used (36 in omelets, and 4 in egg and ham sandwiches), 30 ounces of ham are used, 20 slices of bread plus 3 plain sandwiches are used, and 10 green peppers are used. There is no remaining inventory of these items. A total of 10 ounces of mushrooms are used, so 4 ounces remain, 12 teaspoons of butter are used, so 3 teaspoons remain, and 27 ounces of cheese are used, so 3 ounces remain. This combination of omelets and sandwiches can be made from the available inventory; furthermore no additional omelets or sandwiches can be made from the remaining inventory. The value of this allocation of resources is $75. There is no other combination of omelets and sandwiches which can be made from the available inventory and has a value higher than $75.

In the foregoing example in the preparation of omelets and sandwiches, constraints were placed on inventory of food materials. The example is now extended to include a bill of resources wherein constraints are present also on availability of equipment used in preparation of the food products. Therefore, in addition to the materials (e.g., food) we now also consider the availability of two resources, skillets and a toaster.

The usage requirements for these resources are given by the following chart:

| | Toaster | Skillet |
|---|---|---|
| Plain omelet | | 3 min |
| Cheese omelet | | 3 min |
| Ham omelet | | 2 min |
| Ham & Cheese omelet | | 4 min |
| Veg. omelet | | 1 min |
| Plain sandwich | | |
| Cheese sandwich | | 3 min |
| Ham sandwich | 2 min | |
| Ham & Cheese sandwich | 2 min | |
| Ham & Egg sandwich | 2 min | 5 min |
| Total Requirements | | |
| Toaster | 24 min | |
| Skillet | 110 min | |

The total requirements for these resources are computed using logic similar to Bill-of-Material explosion. Note that a cheese omelet requires a total of 6 minutes of skillet time, 3 in the "subassembly" process of making the plain omelet, and 3 in the final assembly process of making the cheese omelet from the cheese and plain omelet.

Suppose that we have one toaster, available for 20 minutes, and 6 skillets, each available for 15 minutes.

We modify the LP (1)–(5) to include constraints representing the availability of these two resources, as follows.

$3x_1 + 3x_2 + 2x_3 + 4x_4 + x_5 + 3x_7 + 5x_{10} \leq 90 \quad 2x_8 2x_9 + 2x_{10} \leq 20$ The first inequality in (6) says that the total time for which the skillets are used does not exceed the total time for which the skillets are available (90=6×15). The second inequality says that the total time required by the toaster does not exceed the time available on the toaster.

Note that the optimal solution to the previous LP with constraints (1)–(5) uses 76 minutes of skillet time and 24 minutes of toaster time, and therefore it is not feasible with respect to the resource availability constraints (6).

We can find the optimal solution that satisfies the material availability constraints and the resource availability constraints simultaneously by simply appending the constraints (6) to the A matrix and b vector, and solving the resulting LP.

max cx s.t constraints (1), (2), (3), (4), (5), (6).

or, letting A' and b' respectively denote the enlarged A matrix and b vector $A' \begin{pmatrix} x \\ s \end{pmatrix} \leq b'$ $x \geq 0$ $s \geq 0$ The optimal solution to this new, enlarged LP is given by

| | | | |
|---|---|---|---|
| $x_1 = 12$ | $x_6 = 10$ | $s_1 = 0$ | $s_7 = 3$ |
| $x_2 = 2$ | $x_7 = 2$ | $s_2 = 2$ | $s_8 = 1$ |
| $x_3 = 3$ | $x_8 = 1$ | $s_3 = 3$ | $s_9 = 5$ |
| $x_4 = 2$ | $x_9 = 5$ | $s_4 = 2$ | $s_{10} = 4$ |
| $x_5 = 5$ | $x_{10} = 4$ | $s_5 = 5$ | |

The value of this solution is $73.25, which is less that the value of the solution to the allocation problem defined by only constraints (1)–(5).

EXAMPLE OF A MULTI-PERIOD MODEL

Extending the single period model to a multi-period model requires additional decision variables and constraints. These variables and constraints are used to keep track of the inventory (raw materials, subassemblies, and products) and the demand backlog that is carried from one period to the next.

For the multi-period model we make the following assumptions.

1. Unmet demand in one period is available to be served in the next period.
2. Unused material in one period is available for use in the next period.
3. Unused capacity (resource) in one period is not available for use in the next period.

These assumptions are realistic in many manufacturing companies. As an illustration, we continue the food example, but restrict ourselves to only the sandwiches. We consider 2 time periods, say an early lunch period and late lunch period, and we assume that a delivery of raw materials arrives between the two lunch periods.

We let demand be given by:

|  | Early Lunch | Late Lunch |
| --- | --- | --- |
| Plain sandwiches | 4 | 2 |
| Cheese sandwiches | 5 | 6 |
| Ham sandwiches | 7 | 8 |
| Ham & cheese sandwiches | 6 | 9 |
| Ham & egg sandwiches | 3 | 4 |

We let supply be given by:

|  | Initial Inventory | New Supply |
| --- | --- | --- |
| Plain sandwiches | 2 | 0 |
| Cheese sandwiches | 1 | 0 |
| Bread | 20 slices | 30 slices |
| Ham | 25 oz. | 15 oz. |
| Cheese | 30 oz. | 20 oz. |
| Eggs | 5 | 2 |

We let resource availability (in minutes) be given by:

|  | Early Lunch | Late Lunch |
| --- | --- | --- |
| Toaster | 40 | 30 |
| Skillet | 15 | 20 |

Total Requirements for Raw Ingredients

|  | Early Lunch | Late Lunch |
| --- | --- | --- |
| Bread | 44 | 58 |
| Cheese | 24 | 36 |
| Ham | 36 | 46 |
| Egg | 3 | 4 |

Total Requirements for Resources

|  | Early Lunch | Late Lunch |
| --- | --- | --- |
| Toaster | 32 | 42 |
| Skillet | 27 | 38 |

Net Requirements for Ingredients:

|  | Early Lunch | Late Lunch |
| --- | --- | --- |
| Bread | 24 | 28 |
| Cheese | — | 10 |
| Ham | 11 | 31 |
| Egg | — | — |

Net Requirements for Resources:

|  | Early Lunch | Late Lunch |
| --- | --- | --- |
| Toaster | — | 12 |
| Skillet | 12 | 18 |

Notice that the extra cheese remaining at the end of the early lunch period (6=30−24) is used in the later lunch period (6+20−30=10), so that the late lunch period net requirement for cheese is only 10, rather than 16. In contrast, the extra time available for the toaster in the early period cannot be used in the late lunch period.

The linear programming formulation for the two period model requires some additional decision variables.

Let $v_6$=number of plain sandwiches held in inventory at the end of the early lunch period.

Let $v_7$=number of cheese sandwiches held in inventory at the end of the early lunch period Let $v_8$=number of ham sandwiches held in inventory at the end of the early lunch period Let $v_9$=number of ham and cheese sandwiches held in inventory at the end of the early lunch period Let $v_{10}$=number of ham and egg sandwiches held in inventory at the end of the early lunch period $v_{11}$=number of slices of bread held in inventory at the end of early lunch period $v_{12}$=amount of cheese held in inventory at the end of early lunch period $v_{13}$=amount of ham held in inventory at the end of early lunch period $v_{14}$=amount of eggs held in inventory at the end of early lunch period The model must include production variables x, and service variables s for each of the five products in each of the 2 lunch periods.

We let $x_{6,e}$ (resp. $x_{6,1}$) denote the number of plain sandwiches produced in the early (resp. late) lunch periods.

Similarly $x_{7,e}$ and $x_{7,1}$ denote the production of cheese sandwiches in the early, late lunch periods; $x_{8,e}$ and $x_{8,1}$ denote the production of ham sandwiches in the early, late lunch period.

$x_{9,e}$ and $x_{9,1}$—ham and cheese sandwiches $x_{10,e}$ and $x_{10,1}$—ham and egg sandwiches We again use s to denote the number of sandwiches served. The first subscript will denote the part number (sandwich type) and the second will denote the lunch period.

For example:

$S_{7,e}$ is the number of cheese sandwiches served in the early lunch period

The linear programming model requires material availability constraints for each part number in each time period, and service (shipment) accumulation constraints for each demand and each time period.

For the first time period the constraints take the form $$
\begin{array}{llllll}
2x_{6,e} & & & & v_{11} & = 20 \text{ (bread)} \\
& 3x_{7,e} & + & 2x_{9,e} & +v_{12} & = 30 \text{ (cheese)} \\
& & 3x_{8,3} & +2x_{9,e}+x_{10,e} & +v_{13} & = 25 \text{ (ham)} \\
& & x_{8,e} & +x_{10,e} & +v_{14} & = 5 \text{ (eggs)} \\
-x_{6,e} & +s_{6,e} & +x_{7,e} + x_{8,e}+x_{9,e}+x_{10,e}+v_6 & & & = 2 \text{ (pl. sand)} \\
& -x_{7,e} & +s_{7,e} & + v_7 & & = 1 \text{ (ch. sand)} \\
& & -x_{8,e} & +s_{8,e} & +v_8 & = 0 \text{ (ham sand)} \\
& & -x_{9,e} & +s_{9,e} & +v_9 & = 0 \text{ (h\&ch. sand)} \\
& & -x_{10,e}+ & s_{10,e} & +v_{10} & = 0 \text{ (h\&e sand)} \\
& 2x_{8,e} & +2x_{9,e} + 2x_{10,e} & & & \leq 40 \text{ (toaster)} \\
3x_{7,e} & & +5x_{10,e} & & & \leq 15 \text{ (skillet)}
\end{array}
$$

Notice that in the single period model the resource and material availability constraints were inequalities. In the multi-period model, it is necessary to track the carry-over of inventory from one period to the next. Inventory carried from one period to the next is exactly equal to the amount of material that was available at the beginning of the period, minus what is used during the period.

For the second period (late lunch) the material availability and resource availability constraints take the form $$
\begin{array}{llllllll}
-v_{11}+ & 2x_{6,l} & & & & & & \leq 30 \text{ (bread)} \\
& -v_{12} & +3x_{7,l} & & +2x_{9,l} & & & \leq 20 \text{ (cheese)} \\
& & -v_{13} & +3x_{8,l} & +2x_{9,l} & +x_{10,l} & & \leq 15 \text{ (ham)} \\
& & & -v_{14} & & +x_{10,l} & & \leq 2 \text{ (egg)} \\
-v_6 & -x_{6,l} & +s_{6,l} & -x_{7,l} & +x_{8,l} & +x_{9,l} & +x_{10,l} & \leq 0 \text{ (pl. sand)} \\
-v_7 & -x_{7,l} & & +s_{7,l} & & & & \leq 0 \text{ (ch. sand)} \\
-v_8 & & -x_{8,l} & & +s_{8,l} & & & \leq 0 \text{ (hamsand)} \\
-v_9 & & -x_{9,l} & & & +s_{9,l} & & \leq 0 \text{ (ham\&ch)} \\
-v_{10} & & & -x_{10,l} & & & +s_{10,l} & \leq 0 \text{ (ham\&egg)} \\
& 2x_{8,l} & +2x_{8,l} & & +2x_{10,l} & & & \leq 30 \text{ (toaster)} \\
3x_{7,l} & & & & +5x_{10,l} & & & \leq 30 \text{ (skillet)}
\end{array}
$$

Notice that in the material balance constants for the second period, the supply remaining at the end of the first period is included as additional material availability. Also, in this case, since there are only two periods, we do not require additional variables to track the inventory available at the end of the late period, and the material availability constraints are inequalities. We also include constraints on the inventory variables that specify that inventory must be non-negative.

$$v_7 \geq 0, v_8 \geq 0, v_9 \geq 0, v_{10} \geq 0, v_{11} \geq 0, v_{12} \geq 0, v_{13} \geq 0, v_{14} \geq 0$$

In addition to the material and resource availability constraints, we require demand or backlog accumulation constraints and backlog variables.

For each product, we define a backlog variable that represents the amount of demand that was not satisfied in the early period. (Recall the assumption that unit demand in one period can be met in a later period).

Let $b_6$=backlog of demand for plain sandwiches from early lunch

Let $b_7$=backlog of demand for cheese sandwiches from early lunch

Let $b_8$=backlog of demand for ham sandwiches from early lunch

Let $b_9$=backlog of demand for ham and cheese sandwiches from early lunch

Let $b_{10}$=backlog of demand for ham and egg sandwiches from early lunch

The constraints (4) in the single period model are replaced by the following set of constraints:

$s_{6,e}+b_6=4$
$s_{7,e}+b_7=5$
$s_{8,e}+b_8=7$
$s_{9,e}+b_9=6$
$s_{10,e}+b_{10}=3$

Thus, for example, $b_7=5-S_{7,e}$, is the number of cheese sandwiches demanded in the early lunch period, minus the number of cheese sandwiches served in the early lunch period, that is, the backlog of cheese sandwiches for the late lunch period.

For the late-lunch period we have:

$s_{6,1}-b_6 \leq 2$
$s_{7,1}-b_7 \leq 6$
$s_{8,1}-b_8 \leq 8$
$s_{9,1}-b_9 \leq 9$
$s_{10,1}-b_{10} \leq 4$ These inequalities say that the number of, for example, cheese sandwiches, served in the late lunch period cannot exceed the sum of the backlog from the early lunch period plus the new demand in the late lunch period.

As in the single period example, all of the model variables, x, v, s, b, are required to be non-negative.

The objective function is again maximization of revenue.

max
$1.00 s_{6,e} + 1.50 s_{7,e} + 2.50 s_{8,e} + 3.0 s_{9,e} + 3.50 s_{10,e} +$ $1.00 s_{6,1} + 1.50 s_{7,1} + 2.50 s_{8,1} + 3.00 s_{9,1} + 3.50 s_{10,1}$ This problem can be written as $$\max c\,s$$

$$s \cdot t A_1 \begin{pmatrix} x \\ s \\ v \\ b \end{pmatrix} = f_1$$

$$A_2 \begin{pmatrix} x \\ s \\ v \\ b \end{pmatrix} \leq f_2$$

$$x \leq 0, s \leq 0, v \leq 0, b \leq 0$$

This concept of carrying inventory and backlog from one period into the next period can be extended to models with arbitrarily many periods.

The objective function of the linear program can include any additional terms that are linear combinations of the model variables. For example, it can include a term representing the manufacturing cost of each of the products as a multiple of the appropriate production variables x, backlog cost, as multiples of the backlog variables b, holding costs, as multiples of the inventory variables v, etc.

For the particular problem presented above, the optimal solution is:

| | |
|---|---|
| $s_{e,6} = 0$ | $x_{e,6} = 10$ |
| $s_{e,7} = 1$ | $x_{e,7} = 0$ |
| $s_{e,8} = 1$ | $x_{e,8} = 1$ |
| $s_{e,9} = 1$ | $x_{e,9} = 8$ |
| $s_{e,10} = 3$ | $x_{e,10} = 3$ |
| $s_{1,6} = 4$ | $x_{1,6} = 15$ |
| $s_{1,7} = 0$ | $x_{1,7} = 0$ |
| $s_{e,8} = 0$ | $x_{1,8} = 0$ |
| $s_{1,9} = 9$ | $x_{1,9} = 7$ |
| $s_{1,10} = 4$ | $x_{1,10} = 4$ |

LP FORMULATION STEPS

1. Define production variables.

Require variable $x_{j,t}$ if j is the part number of a product (has a bill of material and/or a bill of resources) and it is a period of time in which part number j can be completed.

2. Define stock variables.

Require $v_{j,t}$ for part number j if excess inventory of p/n j can be carried over from period t to period t+1.

3. Define scrap variables.

Require $\hat{v}_{j,t}$ for part number j if excess inventory of p/n j can be scrapped at end of period t.

4. Define resource surplus variables.

$u_{r,t}$ for each resource r and each period t.

5. Define shipment variables.

$s_{d,t}$ for each demand d and each period t.

6. Define backlog variables.

$b_{d,t}$ for each demand d and each period t such that $$\sum_{\tau \leq t} q_{d,\tau} > 0$$

7. Define inventory balance constraints and right hand side.

$$\sum_{\substack{d \in D \\ s \cdot t \cdot p(d) = j}} s_{d,t} + \sum_{k \in J} a_{jk} x_{k,t} + v_{j,t} + \hat{v}_{j,t} - x_{j,t} - v_{j,t-1} = e_{j,t}$$

for all parts j and all periods t-1.
Here $$\sum_{\substack{d \in D \\ s \cdot t \cdot p(d) = j}} s_{d,t}$$

is the total shipment of part number j in period t, to all of the demands d for this part number $\{d \in D | p(d) = j\}$.

The sum $$\sum_{k \in J} a_{jk} x_{k,t}$$

is the total usage of part number j in all of the other part numbers. The coefficients $a_{jk}$ are obtained from the bill of material data.

The quantity $v_{j,t}$ is the stock of part number j that is to be carried over from the end of period t into period t+1.

The quantity $\hat{v}_{j,t}$ is the amount of part number j that is to be scrapped at the end of period t.

The quantity $x_{j,t}$ is the amount of part number j that completes production in period t and is available for shipment or use in other products. This variable exists only if part number j is a product.

The quantity $e_{j,t}$ is the amount of part number j that is made available from external sources (purchase, etc.) during period t. $e_{j,t}$ is obtained from the supply data or material availability data.

And finally, the quantity $v_{j,t-1}$ is the quantity of part number j that remained available at the end of period t-1 and was carried over into period t, Step 8:

Define the resource availability constraints and right hand side.

$$\sum_{j \in J} g_{rj} x_{jt} + u_{r,t} = c_{r,t} \quad \forall r,t$$

The sum $$\sum_{j \in J} g_{rj} x_{jt}$$

is the total amount of resource r that is used by all of the part numbers in period t. The coefficients $g_{r,j}$ are obtained from the bill of resource data.

The quantity $u_{r,t}$ is the amount of resource r that remains unused in period t. The quantity $c_{r,t}$ is the amount of resource r that is available in period t. It is obtained from the resource availability data.

Step 9

Define the backlog constraints and right-hand side $$b_{d,t} - b_{d,t-1} + s_{d,t} = q_{d,t} \forall d,t$$

$b_{d,t}$ is the backlog at the end of period t for demand d.

$b_{d,t-1}$ is the backlog at the end of period t-1 for demand d.

$q_{d,t}$ is the demanded quantity for demand d in period t. It is obtained from the demand data.

$s_{d,t}$ is the shipment for demand d in period t.

Step 10

Define the non-negativity constraints for all of the variables.

$$x_{j,t} \geq 0 \quad u_{r,t} \geq 0$$
$$s_{d,t} \geq 0 \quad v_{j,t} \geq 0$$
$$b_{d,t} \geq 0 \quad \hat{v}_{j,t} \geq 0$$

Step 11

Define the objective function coefficients.

$$\sum_{t \in T} \left( \sum_{j \in J} H_{j,t} v_{j,t} + \sum_{j \in J} S_{j,t} \hat{v}_{j,t} + \sum_{d \in P} P_{d,t} b_{d,t} - \sum_{d \in D} R_{d,t} s_{d,t} + \sum_{r \in R} Q_{r,t} u_{r,t} \right)$$

$H_{j,t}$ is the holding cost, or inventory carrying cost for p/n j in period t.

$S_{j,t}$ is the scrapping cost of p/n j in period t.

$P_{d,t}$ is the backlog penalty for demand d in period t.

$R_{d,t}$ is the shipment revenue for demand d in period t.

$Q_{r,t}$ is the surplus cost of resource r in period t.

All of these coefficients are obtained from the cost or revenue data.

Step 12 (optional)

Define substitution constraints and variables and objective function coefficients. Modify material and resource availability constraints, and objective function.

Step 13 (optional)

Define alternate BOM and/or BOR variables, constraints and objective function coefficients. Modify material and resource availability constraints. Add linking constraints, if required modify objective function.

Step 14 (optional)

Define separation variables, modify the material availability and resource availability constraints, and modify the objective function.

Utilization of the invention, generally, involves production planning and is concerned with determining production and stock levels to meet fluctuating demand requirements. If resources can be acquired as needed and plant capacity is infinitely expandable and contractible at no cost, then the optimal production schedule consists of producing end products according to the demand schedule, and producing subassemblies (i.e., intermediate products) exactly when needed as input to next assembly process. However, in many real assembly systems, the supply of some raw materials is tightly constrained, with long production and/or procurement lead-times. The demand for products fluctuates, both in total volume and in product mix. As a result, just-in-time production is not usually feasible, and when feasible, may result in poor utilization of resources. This tool provides methods for determining the best utilization of the available resources, given the current forecast of demand requirements.

Since both the inventory balance equations and the profit maximization objective function are linear (see formulation below), it is not surprising or new to consider linear programming approaches to resource allocation problems. Several "textbook" formulations have been published. However, the inventory management literature cautions against the use of linear programming for resource planning because of the difficulty of accurately formulating the allocation problem for a multi-level assembly process, because of the size and complexity of the formulation for even simple single level assembly processes, and because of the difficulty of interpreting and implementing the solution of the linear program. Recent improvements in LP software packages and computing hardware have rendered the size considerations less forbidding; it is now possible to solve realistic problems in a reasonable amount of time. For example, on an RS/6000, the LP corresponding to a real production planning problem for 400 part numbers, 500 demands, and 26 weeks, can be solved in under 10 minutes cpu time. This invention addresses the remaining considerations: accurately formulating the allocation problem, and enabling effective use of the results by inventory managers.

A basic problem which can be handled by the invention is multi-period resource allocation. Determine the optimal allocation of material and capacity by formulating the allocation problem as a linear program, applying a linear programming software package, such as OSL or MPSX, or the Karmarkar algorithm and converting the LP solution into a production and shipment plan. We assume that the planning horizon has been partitioned into T planning periods of equal length (e.g. weeks).

Inputs:

Supply data

Resource availability (Capacity) information

Demand data

BOM information (product, p/n, usage quantity, usage period, effectivity dates)

BOR information (product, resource, usage quantity, usage period, effectivity dates)

Cost

Model Assumptions

Unused MATERIAL remains available for use in the next period.

Unused RESOURCES are not available in later periods.

Unfilled demand can be filled later.

Notation

Figure 10:
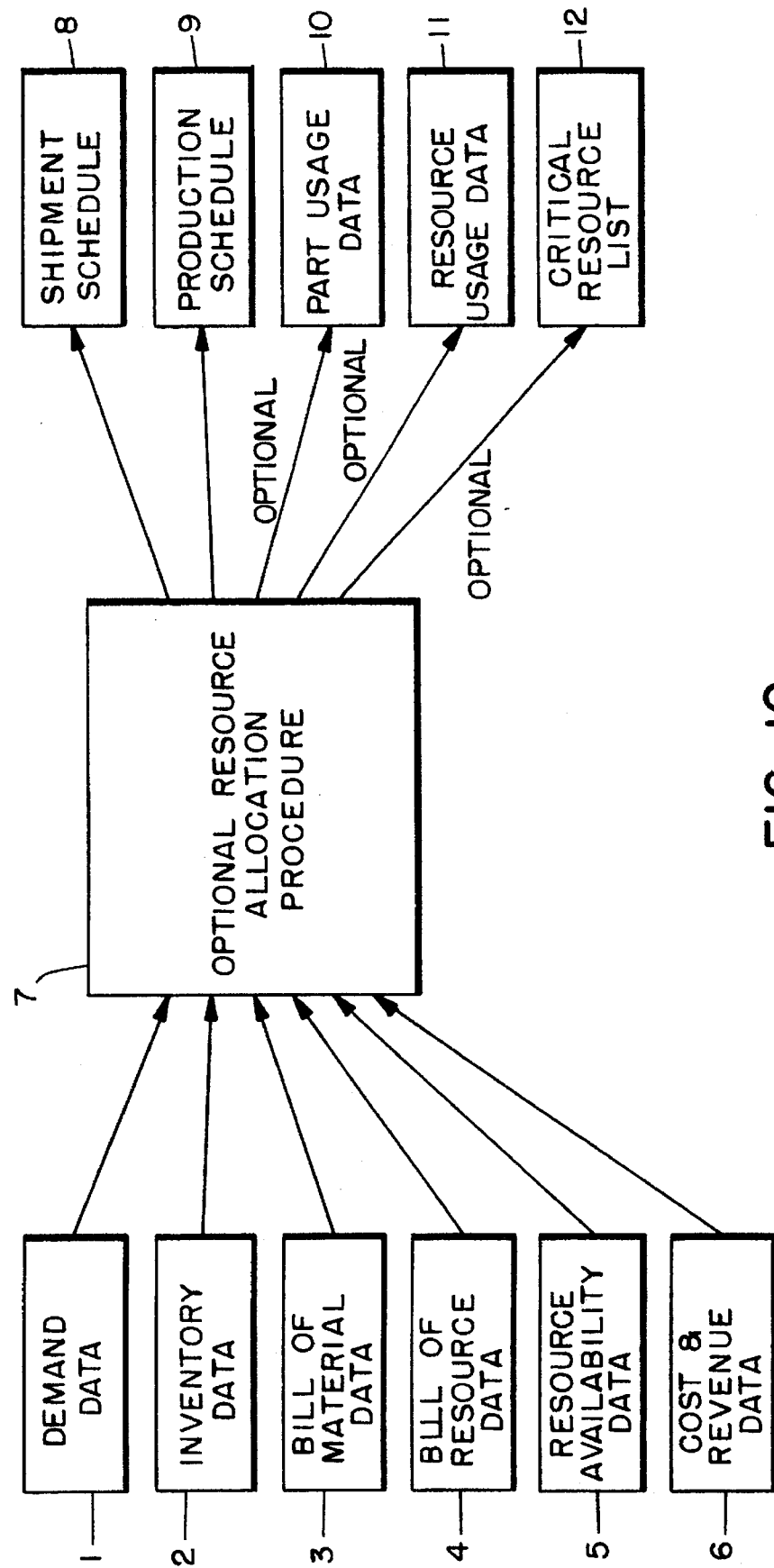
FIG. 10 is a diagram showing a flow of data for the optimal resource allocation procedure.

J=set of part-numbers
  $v_{j,0}$=initial stock of product j (input #2 in FIG. 10)
  $e_{j,t}$=net external supply of j in period t (input #2 in FIG. 10)
  $a_{i,j}$=quantity of p/n i required per unit p/n j (input #3 in FIG. 10)

R=set of resources—input #7 in diagram
  $g_{r,j}$=quantity of resource r required per unit of p/n j (input #4 in FIG. 10)
  $c_{r,t}$=quantity of resource r available in period t (input #5 in FIG. 10)

D=set of demands (input #1 in FIG. 10) p(d) ∈J, P/N for demand d∈D
  $q_{d,t}$=quantity of demand d in period t
  $b_{d,0}$=initial backlog for demand d This formulation permits multiple demands for each part number. These demands may have different penalties and revenue coefficients associated with them. These penalties and revenues appear in the following summation for the objective function.

Decision Variables $x_{j,t}$=quantity of p/n j produced in period t (output #9 in FIG. 10)

$s_{d,t}$=quantity of demand d filled in period t (output #8 in FIG. 10)

$b_{d,t}$=backlog of demand d at end of period t $v_{j,t}$=stock of p/n j at the end of period t $\hat{v}_{j,t}$=quantity of p/n j scrapped at the end of period t $u_{r,t}$=quantity of resource j unused at the end of period t CONSTRAINTS for "instantaneous production"
$$b_{d,t} - b_{d,t-1} + s_{d,t} = q_{d,t} \quad \forall d,t \text{ (backlog accounting)}$$

$$\sum_{\substack{d \in D \\ p(d)=j}} s_{d,t} + \sum_{k \in J} a_{j,k} x_{k,t} + v_{j,t} + \hat{v}_{j,t} - x_{j,t} - v_{j,t-1} = e_{j,t} \quad \forall j,t$$

(material balance)

$$\sum_{j \in J} g_{r,j} x_{j,t} + u_{r,t} = c_{r,t} \quad \forall r,t$$

(resource availability)

$$x_{j,t} \geq 0, s_{d,t} \geq 0, v_{j,t} \geq 0, b_{d,t} \geq 0, u_{r,t} \geq 0, \hat{v}_{j,t} \geq 0$$

Objective function: Notation: (input #6 in FIG. 10)

$S_{r,t}$=holding cost per unit of p/n j in period t
$H_{j,t}$=holding cost per unit of p/n j in period t
$M_{j,t}$=manufacturing cost per unit of p/n j in period t
$R_{d,t}$=revenue per unit of demand d shipped in period t
$P_{d,t}$=penalty per unit backlog of demand d in period t
$Q_{r,t}$=penalty per unit excess of resource r in period t $$\text{MIN} \sum_{t \in T} (\sum_{j \in J} H_{j,t} v_{j,t} + \sum_{j \in J} S_{j,t} \hat{v}_{j,t} + \sum_{j \in J} M_{j,t} x_{j,t} +$$

$$\sum_{d \in D} P_{d,t} b_{d,t} + \sum_{r \in R} Q_{r,t} u_{r,t} - \sum_{d \in D} R_{d,t} s_{d,t})$$

Alternately, one can formulate an objective function based on some notion of product or demand serviceability, and an associated penalty for failing to meet serviceability targets.

In real assembly processes, it may take several periods to produce a product, and the product may require materials (p/n s) and resources in each of these periods. Such considerations can easily be included in the above formulation by keeping track of the release period of each product, the period when each input material or resource is required, and the completion period. The time indices t in the above constraints are appropriately modified.

Let m(j) denote the manufacturing lead time (rounded to an integer number of model periods) of p/n j. That is, if one begins the manufacturing process for a single unit of p/n j in period t, that unit of p/n j will be complete in period t+m(j).

Each of the p/n's i in p/n j's bill-of-material, and each of the resources r in p/n j's bill of resources have an associated usage offset f(i,j) and f(r,j) respectively. The usage offset is assumed to be a non-negative integer, and is interpreted as follows:

p/n j is completed in period t, then material p/n i is required in period t−f(i,j) and resource r is required in period t−f(r,j).

Incorporating these manufacturing lead time and offset considerations into the constraint matrix requires the following modification of the material balance and resource availability constraints.

$$\sum_{\substack{d \in D \\ p(d)=j}} s_{d,t} + \sum_{k \in J} a_{j,k} x_{k,t+f(j,k)} + v_{j,t} + \hat{v}_{j,t} -$$

$$x_{j,t} - v_{j,t-1} = e_{j,t} \quad \sum_{j \in J} g_{r,j} x_{j,t+f(r,j)} + u_{r,t} = c_{r,t}$$

Note that the subscripts indicating the time index of the x variables have been changed.

The variable $x_{k,t+f(j,k)}$ represents the quantity of p/n k that is completed in period t+f (j,k). According to the definition of the offset f(j,k), each of these $x_{k,t+f(j,k)}$ units of p/n k require $a_{j,k}$ units of p/n j in period t+f(j,k)−f(j,k)=t. Thus, $$\sum_{k \in J} a_{j,k} x_{k,t+f(j,k)}$$

is the total amount of p/n j required for use in other p/ns in period t.

Similarly $$\sum_{j \in J} g_{r,j} x_{j,t+f(r,j)}$$

is the total amount of resource r required for use in all p/ns in period t.

Similarly, the inventory balance constraints can be modified to consider the time-sensitive part or resource usage resulting from engineering and/or technology changes.

Often bill-of-material and bill-of-resources information includes effectivity date information. That is, a p/n, say i, may be used to build another p/n, said j, only during a specific interval, say periods $t_1, t_1+1, \ldots, t_1+t_2$. In all other manufacturing periods, p/n i is not required for the production of p/n j.

This effectivity date information can be used to modify the bill-of-material and bill-of-resource coefficients $a_{i,j}$ and $g_{r,j}$, respectively in the constraint matrix as follows.

For each pair i,j with i∈J, j∈J we define $$a_{i,j,t} = \begin{cases} a_{i,j} & \text{if p/n } i \text{ is required in p/n } j \text{ in period } t \\ 0 & \text{otherwise} \end{cases}$$

$$g_{r,j,t} = \begin{cases} g_{r,j} & \text{if resource } r \text{ required in p/n } j \text{ in period } t \\ 0 & \text{otherwise} \end{cases}$$

The material balance constraint for p/n j becomes $$\sum_{\substack{d \in D \\ p(d)=j}} s_{d,t} + \sum_{k \in J} a_{j,k,t} x_{k,t} + v_{j,t} + \hat{v}_{j,t} - x_{j,t} - v_{j,t-1} = e_{j,t}$$

The resource availability constraint for resource r becomes.

$$\sum_{j \in J} g_{r,j,t} x_{j,t} + u_{r,t} = c_{r,t}.$$

Additional manufacturing considerations, such as yield and fallout can easily be incorporated into the inventory balance constraints. We let $\alpha_j$ be the manufacturing yield of p/n j. That is, for each unit of p/n j that is useable for shipment or for use in other products, $1/\alpha_j$ units of p/n j must be produced. If $\alpha_j=1$, then every unit of p/n j is useable. If $\alpha_j=0.75$ then three quarters of the units of p/n j produced are useable.

For each pair i,j we define $d_{i,j}$ to be the "fallout" of p/n i in p/n j, expressed in units per 100. Thus, if $\alpha_{i,j}=95$, and $d_{i,j}=5$ then a total of 100 units of p/m i is required to produce each unit of p/m j. 95 of the units will be present in the completed p/n j, 5 will be lost in the manufacturing process.

We define, for all pairs i,j $$\tilde{a}_{i,j} = \frac{a_{ij}}{1-(d_{ij} \times .01)}$$

and modify the material balance constraint to include yield and fallout considerations as follows:

$$\sum_{\substack{d \in D \\ p(d)=j}} s_{d,t} + \sum_{k \in J} \tilde{a}_{j,k} x_{k,t} + v_{j,t} + \hat{v}_{j,t} - \frac{1}{\alpha_j} x_{j,t} - v_{j,t-1} = e_{j,t}$$

The coefficients $a_{j,t}$ have been replaced by the scaled coefficients $\tilde{a}_{j,k}$, and the amount of p/n j available from production in period t has been scaled by the yield $\alpha_j$.

If desirable, the formulation can be augmented to include minimum and maximum production quantities in each period, maximum backlog per demand and period, and minimum and maximum stock quantities for each p/n in each period.

Additional input data is needed to describe the production, stock and shipment bounds.

We use the following notation.

$MAXX_{j,t}$=upper bound on production of p/n j in period t.
$MINX_{j,t}$=lower bound on production of p/n j in period t.
$MAXS_{j,t}$=upper bound on stock of p/n j at end of period t.
$MINS_{j,t}$=lower bound or stock of p/n j at end of period t.
$MAXB_{d,t}$=upper bound on backlog of demand d in period t.

The following set of bounding constraints may be added to the basic formulation in any combination.

$$MINX_{j,t} \leq x_{j,t} \leq MAXX_{j,t}$$
$$MINS_{j,t} \leq v_{j,t} \leq MAXS_{j,t}$$
$$b_{d,t} \leq MAXB_{d,t}$$

SUBSTITUTE PARTS AND RESOURCES

Often a product can be built using a part or resource other than the one specified on its BOM or BOR. For example, fast memory modules can be substituted for slow memory modules, but slow modules cannot usually be substituted for fast ones. If substitute part and substitute resource information is given, the resource allocation tool can be used to determine the optimal use of primary and substitution resources.

Additional inputs:

for each BOM entry, substitute information consisting of the substitute part, usage quantity, effectivity dates, and cost or priority information For each BOR entry, substitute information consisting of the substitute resource, usage quantity, effectivity dates, and cost or priority information.

Let $S(i,j)$ be the set of all p/ns f that can substitute for p/n i in p/n j.

$\hat{a}_j^{if}$=quantity of p/n i that is required as substitute for $a_{ij}$ units of p/n i in p/n f Formulation modifications:

Additional variables for each prod-part-sub triple.

$z_{j,t}^{i}$=quantity of p/n j produced in t in which p/n i is not replaced.

$y_{j,t}^{i,f}$=quantity of p/n j produced in t in which p/n i is replaced by p/n f Additional constraints $$x_{j,t} = z_{j,t}^{i} + \sum_{f \in S(i,j)} y_{j,t}^{if} \forall i,j,t \quad (15)$$

Balance equation for p/n i is modified to use $z_{j,t}^{i}$ instead of $x_{j,t}$ and $y_{j,t}^{i,f}$ term is added to balance equations for f The material balance constraint for p/n j becomes $$\sum_{\substack{d \in D \\ p(d)=j}} s_{d,t} + \sum_{\substack{k \in J \\ s(j,k)=\phi}} a_{j,k} x_{k,t} + \sum_{\substack{k \in J \\ s(j,k)\neq\phi}} a_{j,k} z_{k,t}^{j} +$$

$$\sum_{k \in J} \sum_{\substack{i \in J \\ s.t. j \in S(i,k)}} \hat{a}_k^{ij} y_{k,t}^{ij} + v_{j,t} + \hat{v}_{j,t} - x_{j,t} - v_{j,t-1} = e_{j,t}$$

The sum $$\sum_{\substack{k \in J \\ s(j,k)\neq\phi}} a_{j,k} z_{k,t}^{j}$$

is the total usage of p/n j as a prime BOM item in other p/n's for which j has substitutes (that is, j is called for in the BOM of k, j has substitutes and no other p/n is used to substitute for j in k).

The sum $$\sum_{\substack{i \in J \\ j \in S(i,k)}} \hat{a}_k^{ij} y_{k,t}^{ij}$$

is the total usage of j as a substitute for other p/n's in p/n k. Thus $$\sum_{k \in J} \left( \sum_{\substack{i \in J \\ j \in S(i,k)}} \hat{a}_k^{ij} y_{k,t}^{ij} \right)$$

is the total usage of p/n j as a substitute in all other p/n's and the sum $$\sum_{k \in J} a_{j,k} x_{k,t} + \sum_{k \in J} a_{j,k} z_{k,t}^{j}$$

is the total usage of j in all other p/n's.

The objective function can be modified to reflect the additional cost or benefit incurred by using substitute f for part i in p/n j by including a non-zero coefficient for the variable $y_{j,t}^{if}$ Let $\hat{p}_{j,t}^{if}$=cost of substituting p/n f for p/n i in p/n j in period t.

The following terms are added to the objective function $$\sum_{t \in T} \sum_{j \in J} \sum_{i \in J} \sum_{f \in S(i,j)} \hat{p}_{j,t}^{if} y_{j,t}^{if}$$

Similar modifications can be used to optimize the allocation of substitute resources.

Let $R(r,j)$=set of resources that can substitute for resource r in p/n j.

$g_j^{r,f}$=usage of resource f when substituting for resource r in p/n j Defined for $\forall f \in R(r,j)$.

$\tilde{p}_{j,t}^{r,f}$=cost of substituting resource f for resource r in p/n j in period t defined for all $f \in R(j,t) \forall t$.

$\tilde{z}_{j,t}^{r}$=quantity of p/n j produced in period t in which resource r is not replaced. Defined for all j,r s,t $R(r,j)$ is not empty, and $\forall t$.

$\tilde{y}_{j,t}^{r,f}$=quantity of p/n j produced in period t in which resource r is replaced by resource f. Defined for all $f \in R(r,j)$, $\forall t$.

The model requires additional constraints of the form $$x_{j,t} = \tilde{z}_{j,t}^{r} + \sum_{f \in R(r,j)} \tilde{y}_{j,t}^{rf} \forall \begin{array}{c} r,j,s,t \\ R(r,j) \neq \phi, \forall t \end{array}$$

Resource availability constraints are modified as follows:

$$\sum_{\substack{j \in R \\ R(r,j)=\phi}} g_{r,j} x_{j,t} + \sum_{\substack{j \in J \\ R(r,j)=\phi}} g_{r,j} \tilde{z}_{j,t}^{r} + \sum_{j \in J} \sum_{\substack{r' \in R \\ r \in R(r',j)}} \tilde{g}_{j}^{r,r'} \tilde{y}_{j,t}^{r'r} + u_{r,t} = c_{r,t}$$

The following terms are added to the objective function:

$$\sum_{t \in T} \sum_{j \in J} \sum_{r \in R} \sum_{f \in R(r,j)} \tilde{p}_{j,t}^{rf} \tilde{y}_{j,t}^{rf}$$

The output of this model gives not only the shipment and production schedules, but also the substitution usage data.

ALTERNATE BOMS

In addition to substitute parts, a simple extension of the resource allocation model allows for consideration of the possibility of building a part according to more than one bill-of-material or bill-of-resources. For example, certain types of memory modules can be built using one "all good" chip and a corresponding substrate, or using two "half-good" chips, and their corresponding substrate. The resource allocation tool can be used to determine how many of each product should be built in each time period using each possible BOM and/or BOR.

Additional inputs:

For each product, list or BOMs and BORs the model modification is similar to that for substitution.

The following additional input data and notation is required for modeling the optimal allocation of resources in the presence of alternate bill-of-materials.

$K$ = set of all bills-of-materials.

$\tilde{p}^{(k)} \in J$ = p/n produced by BOM $k \in K$.

$\tilde{a}_{i,k}$ = usage of p/n $i \in J$ in BOM $k \in K$.

$\tilde{M}_{k,t}$ = manufacturing cost per unit of $\tilde{p}^{(k)}$ using BOM $k$ in period $t$.

We introduce the following decision variables:

$\tilde{x}_{k,t}$ = production (of p/n $\tilde{p}^{(k)}$) using BOM $k \in K$ in period $t$.

In particular, we allow for the case where there are two (or more) distinct BOM, say $k$ and $k'$ that produce the same p/n, $j = \tilde{p}^{(k)} = \tilde{p}^{(k')}$. For example, It is common practice in computer manufacturing to produce memory modules using either one full-good memory chip and the appropriate packaging material, or using two half-good memory chips, some connecting components, and the appropriate packaging material.

The material balance constraints for p/n $j$ become $$\sum_{\substack{d \\ p(d)=j}} sS_{d,t} + \sum_{k \in K} \tilde{a}_{j,k} \tilde{x}_{k,t} + v_{j,t} + \hat{v}_{j,t} - \sum_{\substack{k \in K \\ p(k)=j}} \tilde{x}_{k,t} - v_{j,t-1} = e_{j,t}$$

The resource availability constraints are replaced by $$\sum_{j \in J} g_{r,j} \left( \sum_{\substack{k \in K \\ p(k)=j}} \tilde{x}_{k,t} \right) + u_{r,t} = c_{r,t}$$

The sum $$\sum_{\substack{k \in K \\ p(k)=j}} \tilde{x}_{k,t}$$

is the total production of p/n in period $t$ from all BOMs $k \in K$ that produce p/n $j$.

The sum $$\sum_{k \in K} \tilde{a}_{j,k} \tilde{x}_{k,t}$$

is the total usage of p/n $j$ in time period $t$ in all BOMs.

The term $$\sum_{t} \sum_{j \in J} M_{j,t} x_{j,t}$$

in the original objective function is replaced by the term $$\sum_{t} \sum_{k \in K} \tilde{M}_{k,t} \tilde{x}_{k,t}$$

Note that the p/n production variables $x_{j,t}$ for $j \in J$ have been replaced by the BOM production variables $\tilde{x}_{k,t}$ for $k \in K$.

A similar approach can be used to allocate material and resources in the presence of the multiple bills-of-resources. We introduce the following additional data and notation:

$L$ = set of all bills-of-materials $\hat{p}(l) \in J$ = p/n produced by BOR $l \in L$ $\hat{g}_{r,l}$ = usage of resource $r \in R$ in BOR $l \in L$ $\hat{M}_{l,t}$ = manufacturing cost per unit of $\hat{p}(l)$ using BOR $l$ in period $t$.

We introduce the following decision variables:

$\hat{x}_{l,t}$ = production (of p/n $\hat{p}(l)$) using BOR $l \in L$ in period $t$.

Note that we allow for the case where there are two (or more) distinct BORs, say $l$ and $l'$ that produce the same p/n, $j = \hat{p}(l) = \hat{p}(l')$.

The material balance constraints for p/n $j$ becomes $$\sum_{\substack{d \\ p(d)=j}} s_{d,t} + \sum_{k \in J} a_{j,k} \left( \sum_{\substack{l \in L \\ \hat{p}(l)=k}} \hat{x}_{l,t} \right) +$$

$$v_{j,t} + \hat{v}_{j,t} - \sum_{\substack{l \in L \\ \hat{p}(l)=j}} \hat{x}_{l,t} - v_{j,t-1} = e_{j,t}$$

The resource availability constraint for resource $r \in R$ becomes $$\sum_{l \in L} \hat{g}_{r,l} \hat{x}_{l,t} + u_{r,t} = c_{r,t}$$

The sum $$\sum_{\substack{l \in L \\ \hat{p}(l)=j}} \hat{x}_{l,t}$$

is the total production of p/n $j$ in period $t$ from all BORs $l \in L$ that produce p/n $j$.

The term $$\sum_{t} \sum_{j \in J} M_{j,t} x_{j,t}$$

in the original objective function is replaced by the term $$\sum_{t} \sum_{l \in L} \hat{M}_{l,t} \hat{x}_{l,t}.$$

Note that the p/n production variables $x_{j,t}$ for $j \in J$ have been replaced by the BOR production variables $\hat{x}_{l,t}$ for $l \in L$.

A model that includes both alternate BOMs and alternate BORs can also be formulated using the notation introduced above. The material balance constraint for p/n j is given by $$\sum_{\substack{d \\ p(d)=j}} s_{d,t} + \sum_{\substack{k \in K \\ p(k)=j}} \bar{a}_{j,k} \hat{x}_{k,t} + v_{j,t} + \hat{v}_{j,t} - \sum_{\substack{k \in K \\ p(k)=j}} \tilde{x}_{k,t} - v_{j,t-1} = e_{j,t}$$

The resource availability constraint for resource r is given by $$\sum_{l \in L} \hat{g}_r \hat{x}_{l,t} + u_{r,t} = c_{r,t}$$

The following additional linking constraint is added:

$$\sum_{\substack{l \in L \\ p(l)=j}} \hat{x}_{j,t} = \sum_{\substack{k \in K \\ p(k)=j}} \tilde{x}_{k,t}$$

The term $$\sum_{t} \sum_{j \in J} M_{j,t} x_{j,t}$$

in the original objective function is replaced by the term $$\sum_{t} \left( \sum_{l \in L} \hat{M}_{l,t} \hat{x}_{l,t} + \sum_{k \in K} \tilde{M}_{k,t} \tilde{x}_{k,t} \right).$$

MULTIPLE p/n FABRICATION PROCESSES

This extension demonstrates how linear programming can be used to solve a complex material planning that cannot be addressed by standard MRP methodology.

In the S/C (semiconductor) fabrication process, basic circuitry is built on a polished silicon wafer to produce a "master slice wafer". Typically, only a small number of different master slices are required by a technology. Each master slice has a single p/n. Then, in the "personalization" process, additional circuitry is built on a master slice, and the completed wafer is cut into individual chips. The completed personalized wafer has a p/n, and a BOM consisting of one master slice wafer; each chip (device) has a p/n. Until recently, each wafer contained only a single type of chip having a common part number, that is, all of the chips on the wafer were identical. In this case, the BOM of a chip consists of the p/n of the personalized wafer that contains the chip, and the usage factor is 1/n where n is the number of chips per wafer. To determine the number of wafers to produce, one determined the number of chips required, and divided this quantity by the expected number of good chips per wafer. Now, however, the trend is to increase the number of different chip p/n s on a wafer, and to permit a single chip p/n to be made on a number of different wafers. In this case the notion of "bill-of-material" for a chip is not well defined. Since the chip may be produced from more than one personalized wafer, there is no straightforward way to determine wafer production quantities from chip requirements. In fact, there are typically many different wafer production schedules that could be used to obtain the required chip quantities. Some combinations may produce large excesses of one or more chip types.

For example consider the following data:
3 chip types A, B, and C which were described above in reference to FIGS. 2, 3 and 4

Consider two products:
P1, consisting of 3 chips of type A and 2 chips of type B;
P2, consisting of 1 chip of type A and 3 of type C; and
3 wafer types:
AXB consisting of 50 chips of A and 50 chips of B;
AXC consisting of 70 chips of A and 30 chips of C;
ABC consisting of 20 chips of A, 30 chips of B and 50 chips of C which were also described above in reference to FIGS. 2–5.

Further, suppose that the demand is for 25 units of P1 and 25 units of P2. Simple explosion through the BOMs of P1 and P2 converts this to a demand for 100 chips of A, 50 chips of B, and 75 chips of C. However, there is no corresponding "explosion" process for determining the required quantities of wafers. Each of the following combinations of wafer releases meets the chip demand:

| | COST |
|---|---|
| 5 ABC (excess: 100 B, 175 C) | $7,500 |
| 2 AXB, 2 ABC (excess: 40 A, 110 B, 25 C) | $5,200 |
| 2 ABC, 1 AXC (excess: 10 B, 55 C) | $4,300 |
| 1 AXB, 3 AXC (excess 160 A, 15 C) | $5,000 |

In general, the number of possible combinations of releases for any specified demand set grows rapidly as the number of chip types, number of wafers, or number of wafers per chip increases. Excess chip inventory costs, and/or wafer product cost data can be used to select among identified wafer release combinations. Alternatively, we can formulate a linear (integer) program which will identify the optimal release combination. The formulation can be expanded to take into account existing inventory of product, chips, and wafers and other resource constraints.

This formulation requires the introduction of some additional terminology and notation. We refer to the processes of separating a unit of one p/n (e.g. personalized wafer) into units of one or more different p/n (e.g., chips) as a separation process. Like assembly processes, a separation process can have a bill of resources. Instead of having a bill of material, a separation process has a bill of products (BOP), which lists the p/n s and their respective quantities that result from the separation process. The BOP is associated with the input part.

Additional Inputs

Bill of Products for each separation process.

Bill of Resources for separation processes. (optional) Cost data associated with each separation process Additional Notation $N_{j,l}$=quantity of p/n j produced from one unit of p/n l.

$M'_{j,t}$=manufacturing cost of separating one unit of part j in period t $g'_{r,j}$=amount of resource r required to separate one unit of p/n j.

Additional Variable $w_{j,t}$=quantity of p/n j separated in period t.

Model—Assuming Instantaneous Assembly and Separation $$MIN \sum_{t \in T} \left( \sum_{j \in J} H_{j,t} v_{j,t} + \sum_{j \in J} M_{j,t} x_{j,t} + \sum_{j \in J} M'_{j,t} w_{j,t} + \right.$$

$$\left. \sum_{j \in J} S_{j,t} \hat{v}_{j,t} + \sum_{r \in R} Q_{r,t} u_{r,t} + \sum_{d \in D} P_{d,t} b_{d,t} - \sum_{d \in D} R_{d,t} s_{d,t} \right)$$

$$s.t. \ b_{d,t} = b_{d,t-1} + q_{d,t} - s_{d,t} \ \forall d,t$$

(backlog accounting)

$$\sum_{\substack{d \in D \\ p(d)=j}} s_{d,t} + \sum_{k \in J} a_{j,k} x_{k,t} + w_{j,t} + v_{j,t} + \hat{v}_{j,t} =$$

$$\sum_{l \in J} n_{j,l} w_{l,t} + x_{j,t} + e_{j,t} + v_{j,t-1} \ \forall j,t$$

(material balance constraint)

$$\sum_{j \in J} g_{r,j} x_{j,t} + \sum_{j \in J} g'_{r,j} w_{j,t} + u_{r,t} = c_{r,t} \ \forall r,t$$

(resource availability constraint)

$$u_{r,t} \geq 0, x_{j,t} \geq 0, s_{d,t} \geq 0, v_{j,t} \geq 0, b_{d,t} \geq 0, w_{j,t} \geq 0$$

Note: we require that $x_{j,t}=0$ unless j has a BOM, and require that $w_{j,t}=0$ unless j has a BOP.

This invention provides for material planning and resource allocation in a complex manufacturing system. In particular, this invention extends the usual notion of material requirements planning to include separation processes. This invention permits consideration of substitute parts and resources, and alternate Bill-of-Materials and Bill of resources. This invention provides methods for constrained an capacitated material planning and resource allocation.

Figure 9:
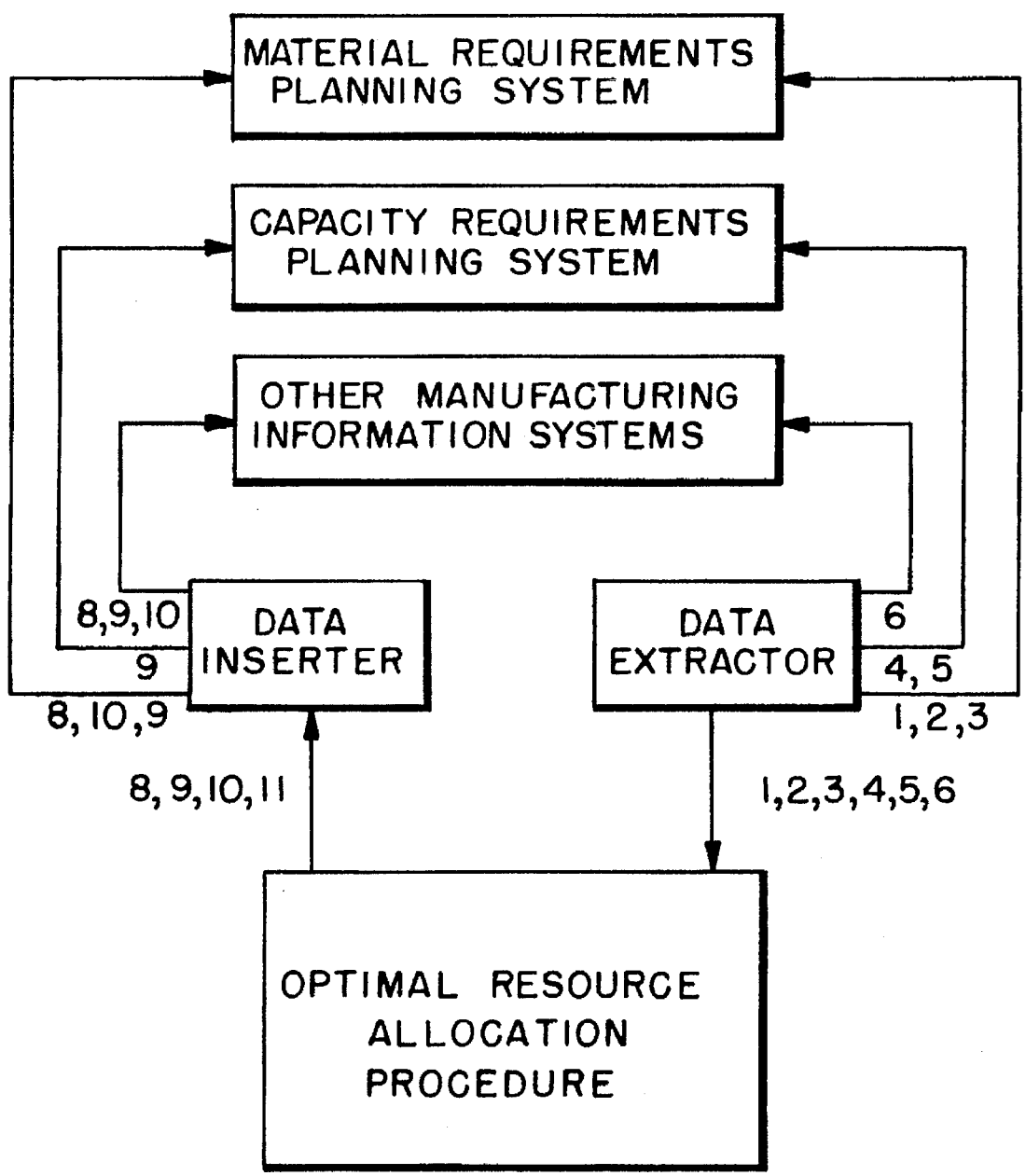
FIG. 9 is a block diagram showing use of the invention for constrained material requirements planning.

Steps in Constrained Material Requirements Planning with reference to FIGS. 9 and 10.

1. Extract data (Demand, inventory, Bill-of Materials, Bill-of-Resources, Resonance availability cost and revenue data) from site information systems. Source of each data element will be determined by the particular configuration of information systems. In the diagram, the demand data, bill-of-material data, and inventory data are extracted from the Material Requirements Planning System, the bill-of resource data and the resource availability data are extracted from the Capacity Requirements Planning system, and the cost and revenue data is extracted from a third manufacturing information system.

2. Use the Optimal Resource Allocation procedure to determine an optimal shipment schedule and the corresponding production schedule and part usage schedule.

3. Insert shipment schedule, production schedule and past usage schedule into site information systems. Again, the destination of each of these data elements depends on the configuration of the information systems. In the diagram, all three data elements are inserted in the Material Requirements Planning system for further processing. In addition, the production schedule is read into the Capacity Requirements Planning System for further processing, and all the data elements are returned to the third manufacturing information system.

Producing the part usage schedule is optional.

1. Demand data: can include backlogged orders, accepted orders, planned orders, and forecasted orders.

2. Inventory data: can include on-hand inventory, supplier orders, planned supplier orders, contractual limits.

3. Bill of materials: Can include alternate bill-of-materials for a part. Can include substitution parts for a product-component pair. Includes effectivity dates, usage rate, fallout, usage offset.

4. Bill of Resources: Can include alternate bill-of-resources for a part, can include substitution resources for a product-resource pair. Includes effectivity dates, usage rate, fallout, and usage offset.

5. Resource availability data: Can include manpower availability, planned downtime, expected downtime.

6. Cost data/Resource data: Includes shipment value, late penalty, holding costs, scrapping costs, manufacturing costs, substitution costs.

| | |
|---|---|
| Read input data | Step 7.1 |
| Process input data and load data structures | Step 7.2 |
| Build LP model | Step 7.3 |
| Define model variables x,s | Step 7.3a |
| Define model constraints | Step 7.3b |
| Fill constraint matrix A | Step 7.3c |
| Fill right-hand-side vector b | Step 7.3d |
| Fill objective function c | Step 7.3e |
| Invoke LP solver | Step 7.4 |
| Extract optimal values of the variables x,s from the LP solver | Step 7.5 |
| Process the optimal values of x,s to determine | Step 7.6 |
| optimal shipment schedule | Step 7.6a |
| optimal shipment schedule | Step 7.6b |
| part usage schedule | Step 7.6c |

Optimal Resource Allocation Procedure

The cost and revenue data is used to compute the coefficients of the objective function.

The bill of material data and bill of resource data are used to construct a portion of the constraint matrix.

The demand data, inventory data, and resource availability data are used in the construction of the right-hand-side of the constraints.

Examples in the practice of the method:

1. A method for material constrained production planning whereby a feasible allocation of material to demand (shipment schedule per demand and period, production schedule per product and period) that maximize profit is determined.

Specifically, in Step 1, demand data, bill-of-material data, inventory data, and cost and revenue data are extracted from an MRP system or from an other manufacturing information system. In Step 2, the Optimal Resource Allocation Procedure processes this data, formulates the Linear Program, invokes an LP solver, extracts the optimal values of the LP variables, translates these values in to a shipment schedule and a production schedule. Then, in Step 3, the shipment schedule and the production schedule are inserted into the MRP system or other manufacturing information system.

2. A method for capacity constrained production planning whereby a feasible allocation of capacity to demand (shipment schedule per demand and period, production schedule per product and period) that maximizes profit is determined.

Specifically, in Step 1, demand data, bill-of-resource data, resource availability data, and cost and revenue data are extracted from a CRP system, or from an other manufacturing information system. In Step 2, the Optimal Resource Allocation Procedure processes this data, formulates the Linear Program, invokes an LP solver, extracts the optimal value of the LP variables, translates these values in to a shipment schedule and a production schedule. Then in Step 3, the shipment schedule and the production schedule are inserted into the CRP system or the other manufacturing information system.

3. A method for material and capacity constrained production planning whereby a feasible allocation of material and capacity to demand (shipment schedule per demand and period, production schedule per product and period) which maximizes profit is determined.

Specifically, in Step 1, demand data, bill-of-material data, and inventory data are extracted from an MRP system or other manufacturing information system, fill-of-resource data and resource availability data are extracted from a CRP system or other manufacturing information system, and cost and revenue data is extracted from the MRP system, the CRP system, or some other manufacturing information system. In Step 2, the Optimal Resource Allocation Procedure processes this data, formulates the Linear Program, invokes an LP solver, extracts the optimal values of the LP variables, translates these values in to a shipment schedule and a production schedule. Then, in Step 3, the shipment schedule and the production schedule are inserted into the MRP system, the CRP system or the other manufacturing information system.

4. A method for capacity constrained Material Requirements Planning where by capacity is allocated to demands to maximize profit, and the resulting production plan (shipment schedule per demand and period, production schedule per product and period), is then analyzed to determine the material requirements.

Specifically, in Step 1, demand data, bill-of-resource data, resource availability data, and cost and revenue data are extracted from an MRP system, a CRP system, or from an other manufacturing information system. In Step 2, the Optimal Resource Allocation Procedure processes this data, formulates the Linear Program, invokes an LP solver, extracts the optimal values of the LP variables, translates these values in to a shipment schedule and a production schedule. Then, in Step 3, the shipment schedule and the production schedule. Then, in Step 3, the shipment schedule and the production schedule are inserted into the MRP system, and standard MRP logic is used to determine the material requirements of the shipment and production schedule.

5. A method for critical components constrained Material Requirements Planning where by a specified set of critical raw materials(for example, components with long lead times, or limited availability) are allocated to demands so as to maximize profit, and the resulting production plan (shipment schedule per demand and period, production schedule per production and period) is then analyzed to determine the requirements of all materials not in the specified set.

Specifically, in Step 1, demand data, bill-of-material data, inventory data, and cost and revenue data are extracted from an MRP system. In a subsequent step (Step 1a) the bill-of-material data is processed to eliminate from each bill-of materials all raw material part numbers which are not in the pre-specified set of critical parts, and all product part numbers which do not use, either directly or on subassemblies, raw materials in the pre-specified set of critical parts. A resulting "stripped" bill-of-materials may have no component parts. Inventory data for raw material part numbers which are not on the pre-specified critical parts list and have demand are replaced by the total demand for that part number in each time period. In Step 2, the Optimal Resource Allocation Procedure processes the reduced set of data produced by Step 1a and formulates the Linear Program corresponding to the reduced set of data. A product which has no component parts on its bill-of-materials results in production variables which are unconstrained, that s, they can take arbitrarily large values. The shipment variables corresponding to these products will exactly equal demand. Step 2 then invokes an LP solver, extracts the optimal values of the LP variables, translates these values in to a shipment schedule and a production schedule. Then, in Step 3, the shipment schedule and the production schedule are inserted into the MRP system. The MRP then uses the original set of bill-of-materials data, the shipment schedule, and the production schedule to determine the requirements of all of the part numbers. In an alternate implementation of this method, the bill-of-material pre-processing (Step 1a) is omitted. Subsequent to Step 1 in Step 1b the inventory data for every raw-material not on the per-specified critical component list, the inventory data is replaced by the vector (M,M,M, . . . ,M) where M is some very large quantity (e.g., expected total annual part usage). This results in that part usage constraints for these parts having extremely large right-hand-sides. In effect, the constraint has been omitted from the formulation. Decision variables that appear only in these constraints become unconstrained.

6. A method for material and capacity constrained Material Requirements Planning where by raw materials (on hand, on order, and projected availability) and capacity are allocated to demands to maximize profit, and the resulting production plan (shipment schedule per demand and period, production schedule per product and period), is then analyzed to determine the requirements of all materials.

Specifically, in Step 1, demand data, bill-of-material data, and inventory data are extracted from an MRP system or other manufacturing information system, bill-of-resource data and resource availability data are extracted from a CRP system or other manufacturing information system, and cost and revenue data is extracted from the MRP system, the CRP system, or some other manufacturing information system. The inventory data is extracted as follows: the inventory of part number i in period to is given by (1) the on hand stock of i for period t=1, (2) the amount of i already ordered and scheduled to arrive in period t for 1<t<leadtime(i) (3) an upper bound on the possible availability or usage of i for t>leadtime (i) In Step 2, the Optimal Resource Allocation procedure processes this data, formulates the Linear Program, invokes an LP solver, extracts the optimal values of the LP variables, translates these values in to a shipment schedule a production schedule, and a material usage schedule. Then, in Step 3, the shipment schedule the schedule, and a material usage schedule are inserted into the MRP system, the CRP system or the other manufacturing information system. If available the MRP system is used to further analyze and report on the usage of materials, particularly on the usage of material beyond its leadtime. Then, either the material usage schedule together with the on-hand and on-order inventory data, or the results of the further MRP analysis, are used to generate new orders for each part number (outside of its leadtime).

7. A method for Earliest Ship Date Quoting in which a set of previously accepted order, a specified new order, material information, and capacity availability information are analyzed to determine the earliest possible shipment date for the specified new order this method first allocates materials and capacity to the previously accepted orders so as to meet the quoted shipment dates, then allocates the remaining material and capacity to the specified new order so as to ship it as early as possible.

Specifically, in Step 1, demand data, bill-of-material data, and inventory data are extracted from an MRP system or other manufacturing information, bill-of-resource data and resource availability data are extracted from a CRP system or other manufacturing information system, and cost and revenue data is extracted from the MRP system, the CRP system, or some other manufacturing information system. The demand data includes previously accepted orders, the specified new order, and a forecast of future orders. Each order is classified according to its type. The due date for the new order is set to the current date, and it is given a high revenue value-higher than the total value of the forecasted orders. In Step 2, the Optimal Resource Allocation Procedure processes this data and formulates the Linear Program. This LP includes shipment bounds, reflecting the fact that the previously committed orders must be shipped on their respective due dates. Then the LP solver is invoked, and the optimal values of the LP variables are extracted and translated in to a shipment schedule and a production schedule. The date at which the new order ships is the earliest possible date at which this order can be shipped. This date is reported to the user, or returned to the MRP system or other manufacturing information system.

8. A method for New Order Assessment in which a set of previously accepted orders, information on shipment revenue and late delivery penalties associated with these orders, a specified new order, shipment revenue associated with shipping this order in each time period, material availability information, and capacity availability information are analyzed to determine whether it is profitable for the manufacturing company to accept the specified order, the most profitable ship date for the order, and the impact on the ship dates of previously accepted orders. This method allocates material and capacity to the set of previously accepted orders and the specified new order in a manner that optimizes the total profit. The resulting shipment schedule is reviewed to determine (1) whether the specified new order is ship, (2) the shipment date of the specified new order, and (3) the shipment dates of the previously accepted orders.

Specifically, in Step 1, demand data, bill-of-material data, and inventory data are extracted from an MRP system or other manufacturing information system, bill-of-resource data and resource availability data are extracted from a CRP system or other manufacturing information system, and cost and revenue data is extracted from the MRP system, the CRP system, or some other manufacturing information system. The demand data includes previously accepted orders, the specified new order, and a forecast of future orders. Each order is classified according to its type. Revenue data for forecasted orders is scaled by the probability of the order materializing. The due date for the new order is set to the current date. In Step 2, the Optimal Resource Allocation procedure processes this data and formulates the Linear Program. This LP includes shipment bounds, reflecting the fact that the previously committed orders must be shipped on their respective due dates. Then the LP solver is invoked, and the optimal values of the LP variables are extracted and translated in to a shipment schedule and a production schedule. If the new order does not appear on the shipment schedule, then it is not profitable to make the order and it should be rejected, or the customer's price should be increased so that the order becomes profitable. If the new order does appear on the shipment schedule, then the date at which the new order ships is the most profitable date at which this order can be shipped. If earlier shipment is desired, the customer price can be increased. The shipment status of the new order, and, if appropriate, the shipment date date are reported to the user, or returned to the MRP system or other manufacturing information system.

9. A method for short term production scheduling in which daily capacity and daily material availability are allocated to products and demands to determine a daily release schedule and daily usage of capacity.

Specifically, the method described in Ex. 3 is used, with time periods set to a day or a shift, rather than than the usual planning period duration of a week or a month.

10. A Method for Optimal Capacity and/or Manpower Allocation, in which material and capacity and/or manpower are allocated to products and demands so as to minimize the cost of unused capacity and manpower.

Specifically, the method described in Ex. 2 is used, with the scrapping cost of capacity and manpower set equal to the actual value of the respective resource, and all other cost and revenue data eliminated.

11. A method for capacity and material constrained production planning using substitute parts in which capacity and material (including substitute parts) are allocated to products and demands so as to maximize profit. The resulting production plan specifies the usage of substitute parts.

Specifically, the method described in Ex. 3 is used, with the bill-of-material data including information about the use of substitute parts and substitute resources. Step 3 also produces a material usage schedule and a capacity usage schedule which explicitly shows the usage of substitute parts and substitute capacity.

12. A method for determining the optimal allocation of production to parallel assembly lines or processes.

Specifically, in Step 1, demand data, bill-of-resource data, resource availability data, and cost and revenue data are extracted from a CRP system, or from an other manufacturing information system. The parallel assembly lines are represented as substitutes on the bill-of-resources. This method uses substitute resources on the bill of substitution data structure to define candidate assembly lines or processes for each product. Processing times can be different for same product on different lines. The cost of unused production capacity can be weighted so as to achieve the desired level of balance between the parallel lines or processes. In Step 2, the Optimal Resource Allocation Procedure processes this data, formulates the Linear Program, invokes an LP solver, extracts the optimal values of the LP variables, translates these values in to a shipment schedule, a production schedules, and a resource usage schedule. The resource usage schedule gives the allocation of products to assembly lines.

13. A method for determining the optimal date for executing an Engineering change.

Specifically, in Step 1, demand data, bill-of-material data, inventory data, and cost and revenue data are extracted from an MRP system or from an other manufacturing information system. The new BOM is represented as a substitute for the old BOM, with the earliest field for substitute are giving the earliest potential EC execution date. Firm coverage (on-hand plus on-order) is used for parts that will be obsoleted by the EC, and planned coverage, or a usage upper bound is used for the remaining parts. A penalty cost is assigned to the use of the substitute (new level) and/or to scrapping of the obsoleted parts. In Step 2, the Optimal Resource Allocation Procedure processes this data, formulates the Linear Program, invokes an LP solver, extracts the optimal values of the LP variables, translates these values in to a shipment schedule and a production schedule. The solution will give production schedule for each EC level, which can be used to determine the EC break-in date. Then, in Step 3, the shipment schedule and the production schedule and the EC break-in date information are inserted into the MRP system or other manufacturing information system.

14. A method for determining the materials and/or capacities that are most significant in restricting production.

Specifically, in Step 1, demand data, bill-of-material data, and inventory data are extracted from an MRP system or other manufacturing information system, bill-of-resource data and resource availability data are extracted from a CRP system or other manufacturing information system, and cost and revenue data is extracted from the MRP system, the CRP system, or some other manufacturing information system. In Step 2, the Optimal Resource Allocation Procedure processes this data, formulates the Linear Program, invokes an LP solver, extracts the optimal values of the LP variables, translates these values in to a shipment schedule and a production schedule. In addition, the "dual variable" are also extracted from the LP solver, and those corresponding to material availability constraints and capacity availability constraints are sorted in decreasing order. Among this set, the constraint with the largest dual variable corresponds to a capacity or material, and a time period such that obtaining more of that capacity or resource in that time period will have the greatest impact on total profit. A list of pairs (material or resource, time period) that have the most potential for impacting profit are reported.

15. A method for End-of-Life Inventory Optimization which determines the optimal allocation of on-hand materials and capacities to products so as to minimize the value of the remaining inventory.

Specifically, in Step 1, demand data, bill-of-material data, and inventory data are extracted from MRP system or other manufacturing information system, bill-of-resource data and resource availability data are extracted from a CRP system or other manufacturing information system, and cost and revenue data is extracted from the MRP system, the CRP system, or some other manufacturing information system. Inventory data is extracted for on-hand and firm order inventory only. The demand data is adjusted, if necessary, to reflect potential demand for each of the possible end products. The holding cost of each material in the final period is set to the value of that material; all other cost and revenue data is eliminated. In Step 2, the Optimal Resource Allocation Procedure processes this data and formulates the Linear Program. The then LP solver is invoked, and the optimal values of the Lp variables are extracted and translated into a shipment schedule and a production schedule. Since the only coefficients in the objective function are holding costs for inventory in the final period, production and shipment schedule correspond to an allocation of resources that minimizes the value of the final inventory.

16. A method for material requirements planning, capacity planning, and production planning and resource allocation for manufacturing processes that include alternate means for producing products.

Specifically, in Step 1, data describing the demand, inventory, bill-of-materials, bill-of-resources, capacity availability, cost and revenue, and bill-of-products is extracted from MRP, CRP and other manufacturing information systems. There may be multiple bill-of-materials and/or multiple bill-of-resources for each product; each bill-of-materials and bill-of-resources may have a distinct cost associated with it. This cost data is included in the cost and revenue data. In Step 2, the Optimal Resource Allocation Procedure processes this data and formulates the Linear Program. There are multiple production variables for each product, corresponding to each of the possible bill-of-materials and bill-of-resources associated with that product. Then the LP solver is invoked, and the optimal values of the LP variables are extracted and translated into a shipment schedule and a production schedule. The production schedule specifies the quantity of each product built with each bill-of-materials and each bill-of-resources in each time period. In Step 3, the shipment schedule and the production schedule are inserted to the MRP system, the CRP system, and the other manufacturing information system.

17. A method for material requirements planning, capacity planning, and production planning and resource allocation for manufacturing processes that include separation operations in which a single part number is transformed into one or more units of two or more different part numbers.

Specifically, in Step 1, data describing the demand, inventory, bill-of-materials, bill-of-resources, capacity availability, cost and revenue, and bill-of-products is extracted from MRP, CRP and other manufacturing information systems. In Step 2, the Optimal Resource Allocation Procedure processes this data and formulates the Linear Program. Then the LP solver is invoked, and the optimal values of the LP variables are extracted and translated into a shipment schedule and a production schedule. In Step 3, the shipment schedule and the production schedule are inserted in to the MRP system, the CRP system, and the other manufacturing information system.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A method for optimizing component allocation in a manufacture of a plurality of products of different types from a set of components by a plurality of manufacturing procedures to obtain an optimum production quantity for each of said product types, comprising steps of:

within each of said procedures, establishing quantities of components to be employed in respective ones of said procedures;

providing an inventory of said components, and placing each type of component of the inventory in a separate location of a vector;

arranging said products as variables in respective product columns of a matrix having rows and columns wherein individual ones of the rows are reserved for respective components of the products, there being a plurality of product columns with a separate column for each product type;

establishing a material constraint for the set of components of the respective component rows by, in each of the component rows, multiplying the product variable of each column by coefficients designating the amount of each component in the product, each of the component rows corresponding to the location of an amount of component type in the vector;

via a plurality of production constraints for said products, constraining shipments of respective ones of said product types minus the quantity of each of the respective product types produced to be less than or equal to a quantity of each of the product types in inventory;

placing said production constraints of said product types in respective ones of additional rows of the matrix with shipments being located in separate shipment columns of the matrix and said product types being located in the respective product columns, there being a separate row for each product type having a nonzero shipment, the quantities of the product types in inventory being entered at locations of said vector corresponding to the matrix row having the production constraints;

via a plurality of demand constraints for said products, constraining shipments of respective ones of said product types to be less than or equal to a demand for the respective product types;

placing said demand constraints of said products in separate additional rows of said matrix with shipments being located in respective ones of said shipment columns of the matrix, the demands for said product types being located in separate locations of said vector corresponding to the respective rows of the demand constraints;

applying a linear programming optimization to said matrix and said vector in accordance with an objective function to obtain an optimum production quantity for each of said product types; and producing, via said plurality of manufacturing procedures, said optimum production quantity for each of said product types.

2. A method according to claim 1 wherein each of said products has a price, and said objective function is to maximize revenue from a sale of said products.

3. A method according to claim 1 wherein, in said manufacturing procedures, an individual product of a selected type of said products serves as a subassembly to be combined with at least one of said components for fabricating a further one of said products, at least a portion of the total quantity of said selected product type being employed as a subassembly for one or more of said prducts, said method further comprising a step of, via a set of sum constraints for each of respective types of said products employed as a subassembly in one or more of said products for which there is demand, constraining the total quantity of said selected product type minus a quantity of the selected product type which is produced to be less than or equal to the quantity of said selected product type in inventory.

4. A method according to claim 3 wherein said set of sum constraints comprises at least one sum constraint.

5. A method according to claim 3 wherein all of said total quantity of a selected product type is employed for one or more subassemblies.

6. A method according to claim 3 wherein said total quantity of products of said selected product type comprises a first portion and a second portion, said first portion serving as a subassembly in one of said products and said second portion being a shipment of the selected product.

7. A method according to claim 6 wherein said set of sum constraints comprises at least a plurality of sum constraints, the method further comprising a step of placing said constraints in separate additional rows of the matrix with the selected product types being located in different rows of the matrix, and wherein products produced from subassemblies are located in corresponding ones of said product columns, and nonzero shipments of said selected product types are located in corresponding ones of said shipment columns.

8. A method according to claim 7 wherein said manufacture is accomplished with the use of a set of resources, each resource of said set of resources being available for a predetermined amount of time, the method further comprising establishing additional resource-constraint rows in said matrix and corresponding additional resource-constraint locations in said vector;

for each of the products employing, in its manufacture, one of said resources, totaling the usage time for each product of said one resource, and setting forth a relationship in the matrix row of said one resource providing for said totaling of resource usage time, said totaling of resource usage time being less than or equal to a maximum amount of resource usage time set forth in the corresponding resource constraint location of said vector.

9. A method according to claim 8 wherein said manufacture extends over a plurality of time periods, and said material constraint applies to a first of said periods, the method further comprising steps of establishing an additional material constraints for additional ones of said periods; and modifying all of said material constraints by adding an additional set of columns to the matrix, equal in number to the number of said periods, to designate a carry-over amount of a component to be carried over from a previous one of the periods for use in a subsequent one of the periods, the carry-over amount being zero in the case of manufacture accomplished in the first period.

10. A method according to claim 1 wherein said manufacture is accomplished with the use of a set of resources, each resource of said set of resources being available for a predetermined amount of time, the method further comprising establishing additional resource-constraint rows in said matrix and corresponding additional resource-constraint locations in said vector;

for each of the products employing, in its manufacture, one of said resources, totaling the usage time for each product of said one resource, and setting forth a relationship in the matrix row of said one resource providing for said totaling of resource usage time, said totaling of resource usage time being less than or equal to a maximum amount of resource usage time set forth in the corresponding resource constraint location of said vector.

11. A method according to claim 1 wherein said manufacture extends over a plurality of time periods, and said material constraint applies to a first of said periods, the method further comprising steps of establishing an additional material constraints for additional ones of said periods; and modifying all of said material constraints by adding an additional set of columns to the matrix, equal in number to the number of said periods, to designate a carry-over amount of a component to be carried over from a previous one of the periods for use in a subsequent one of the periods, the carry-over amount being zero in the case of manufacture accomplished in the first period.

12. A method according to claim 11 wherein said manufacture requires a lead time for one or more of said products, there being a further step of offsetting a manufacturing procedure of said one product to a latter one of said plurality of periods, and a step of displacing said product variable in said matrix from a row of said first period to a row of a latter period.

13. A method according to claim 1 further comprising steps of providing additional demand constraints for said products, and placing said additional demand constraints in separate additional rows of said matrix with shipments being located in respective ones of said shipment columns of the matrix, there being addtional demands for said product types located in separate locations of said vector corresponding to the respective rows of the demand constraints; and modifying said linear programming objective function to include quantities, revenues and penalties for said additional demand constraints.

14. A method according to claim 1 wherein individual ones of said manufacturing procedures can be accomplished by use of substitute components in addition to said first-mentioned components, which are normally used, and wherein:

said step of providing inventory includes a placing of substitute components in said vector;

said step of arranging products includes establishment of additional rows for the substitute components and additional columns for products formed of substitute components; and said step of establishing a material constraint is repeated for the substitute components.

15. A method according to claim 1 wherein said manufacture provides also for a plurality of alternate products in addition to said first-mentioned products, said method further comprising a step of establishing procedures of manufacture for said alternate products, and wherein said step of arranging products includes establishment of additional columns for alternate products; and said step of establishing a material constraint is repeated for the alternate products.

16. A method according to claim 15 wherein, in said manufacturing procedures, there is a step of employing one of said alternate products as a subassembly for production of one of said first-mentioned products.

17. A method according to claim 1 wherein said manufacturing procedures provide for a product yield which is less than unity, the method further comprising:

establishing a fallout and a yield for individual ones of said products wherein the fallout is expressed as a ratio of lost quantity of production to total production, and the yield is expressed as a ratio of successful production to total production; and wherein, in said step of establishing a material constraint, there is a step of multiplying said coefficients by the respective yield factors of said products.

18. A method according to claim 1 wherein there is set of bounds having at least one bound on a manufacturing parameter, the manufacturing parameter including any one of product production quantity, or product shipping quantity, or inventory stock, the bound being either an upper limit or a lower limit, the method further comprising:

introducing said bounds as bound constraints in the manufacture of the products; and placing said bound constraints in separate rows of said matrix wherein the magnitude of the bound is placed in a corresponding location of said vector.

19. A method for optimizing resource allocation in a manufacture of a plurality of products of different types from a set of components by use of a plurality of resources in a plurality of manufacturing procedures to obtain an optimum production quantity for each of said product types, comprising steps of:

within each of said procedures, establishing quantities of resources to be employed in respective ones of said procedures;

providing an inventory of said resources, and placing each type of resource of the inventory in a separate location of a vector;

arranging said products as variables in respective product columns of a matrix having rows and columns wherein individual ones of the rows are reserved for respective resources employed in the manufacture of the respective products, there being a plurality of product columns with a separate column for each product type;

establishing a resource constraint for the set of resources of the respective resource rows by, in each of the resource rows, multiplying the product variable of each column by coefficients designating the amount of each resource to be employed in manufacture of the product, each of the resource rows corresponding to the location of an amount of resource type in the vector;

via a plurality of production constraints for said products, constraining shipments of respective ones of said product types minus the quantity of each of the respective product types produced to be less than or equal to a quantity of each of the product types in inventory;

placing said production constraints of said product types in respective ones of additional rows of the matrix with shipments being located in separate shipment columns of the matrix and said product types being located in the respective product columns, there being a separate row for each product type having a nonzero shipment, the quantities of the product types in inventory being entered at locations of said vector corresponding to the matrix row having the production constraints;

via a plurality of demand constraints for said products, constraining shipments of respective ones of said product types to be less than or equal to a demand for the respective product types;

placing said demand constraints of said products in separate additional rows of said matrix with shipments being located in respective ones of said shipment columns of the matrix, the demands for said product types being located in separate locations of said vector corresponding to the respective rows of the demand constraints;

applying a linear programming optimization to said matrix and said vector in accordance with an objective function to obtain an optimum production quantity for each of said product types; and producing, via said plurality of manufacturing procedures, said optimum production quantity for each of said product types.

20. A method according to claim 19 wherein each of said products has a price, and said objective function is to maximize revenue from a sale of said products.

21. A method for material constrained production planning whereby a feasible allocation of material to demand for maximization of profit is determined to obtain an optimum production quantity for each of said product types, the material including components in a plurality of manufacturing procedures conducted in accordance with a manufacturing information system for said optimum production quantity, the method comprising steps of:

providing demand data, bill-of-material data, inventory data, cost and revenue data;

within each of said procedures, establishing quantities of components to be employed in respective ones of said procedures;

providing an inventory of said components from said data, and placing each type of component of the inventory in a separate location of a vector;

arranging said products as variables in respective product columns of a matrix having rows and columns wherein individual ones of the rows are reserved for respective components of the products, there being a plurality of product columns with a separate column for each product type;

establishing a material constraint for the set of components of the respective component rows by, in each of the component rows, multiplying the product variable of each column by coefficients designating the amount of each component in the product, each of the component rows corresponding to the location of an amount of component type in the vector;

via a plurality of production constraints for said products, constraining shipments of respective ones of said product types minus the quantity of each of the respective product types produced to be less than or equal to a quantity of each of the product types in inventory;

placing said production constraints of said product types in respective ones of additional rows of the matrix with shipments being located in separate shipment columns of the matrix and said product types being located in the respective product columns, there being a separate row for each product type having a nonzero shipment, the quantities of the product types in inventory being entered at locations of said vector corresponding to the matrix row having the production constraints;

via a plurality of demand constraints for said products, constraining shipments of respective ones of said product types to be less than or equal to a demand for the respective product types;

placing said demand constraints of said products in separate additional rows of said matrix with shipments being located in respective ones of said shipment columns of the matrix, the demands for said product types being located in separate locations of said vector corresponding to the respective rows of the demand constraints;

applying a linear programming optimization to said matrix and said vector in accordance with an objective function to obtain said optimum production quantity for each of said product types to maximize profit;

providing a shipment schedule and a production schedule; and inserting the shipment schedule and the production schedule into said manufacturing information system for a manufacture of each of said product types in said optimum production quantity.

22. A method for material constrained production planning whereby a feasible allocation of material to demand for maximization of profit is determined to obtain an optimum production quantity for each of said product types, the material including components in a plurality of manufacturing procedures conducted in accordance with a manufacturing information system for said optimum production quantity, the method comprising steps of:

providing demand data, bill-of-resource data, resource availability data, cost and revenue data;

within each of said procedures, establishing quantities of components to be employed in respective ones of said procedures;

providing an inventory of said components from said data, and placing each type of component of the inventory in a separate location of a vector;

arranging said products as variables in respective product columns of a matrix having rows and columns wherein individual ones of the rows are reserved for respective components of the products, there being a plurality of product columns with a separate column for each product type;

establishing a material constraint for the set of components of the respective component rows by, in each of the component rows, multiplying the product variable of each column by coefficients designating the amount of each component in the product, each of the component rows corresponding to the location of an amount of component type in the vector;

via a plurality of production constraints for said products, constraining shipments of respective ones of said product types minus the quantity of each of the respective product types produced to be less than or equal to a quantity of each of the product types in inventory;

placing said production constraints of said product types in respective ones of additional rows of the matrix with shipments being located in separate shipment columns of the matrix and said product types being located in the respective product columns, there being a separate row for each product type having a nonzero shipment, the quantities of the product types in inventory being entered at locations of said vector corresponding to the matrix row having the production constraints;

via a plurality of demand constraints for said products, constraining shipments of respective ones of said product types to be less than or equal to a demand for the respective product types;

placing said demand constraints of said products in separate additional rows of said matrix with shipments being located in respective ones of said shipment columns of the matrix, the demands for said product types being located in separate locations of said vector corresponding to the respective rows of the demand constraints;

wherein said manufacture is accomplished with the use of a set of resources, each resource of said set of resources being available for a predetermined amount of time, the method further comprising establishing additional resource-constraint rows in said matrix and corresponding additional resource-constraint locations in said vector;

for each of the products employing, in its manufacture, one of said resources, totaling the usage time for each product of said one resource, and setting forth a relationship in the matrix row of said one resource providing for said totaling of resource usage time, said totaling of resource usage time being less than or equal to a maximum amount of resource usage time set forth in the corresponding resource constraint location of said vector;

applying a linear programming optimization to said matrix and said vector in accordance with an objective function to obtain said optimum production quantity for each of said product types to maximize profit;

providing a shipment schedule and a production schedule; and inserting the shipment schedule and the production schedule into said manufacturing information system for a manufacture of each of said product types in said optimum production quantity.

23. A method for critical components constrained materials requirements planning whereby a specified set of critical raw materials are allocated to demands to obtain an optimum production quantity for each of said product types so as to maximize profit, and the resulting production plan is then analyzed to determine the requirements of all materials not in the specified set, the critical raw materials including components in a plurality of manufacturing procedures conducted in accordance with a manufacturing information system for said optimum production quantity, the method comprising steps of:

- extracting demand data, bill-of-material data, inventory data from a manufacturing information system;
- eliminating from each bill-of-materials all raw material part numbered units which are not in a predetermined set of critical parts, and all product part numbered units which do not use, either directly or on subassemblies, raw materials in the predetermined set of critical part, thereby to provide a reduced bill of materials;
- replacing inventory data for raw material part numbered units which are not on the predetermined critical parts list and which have demand by a total demand for respective ones of the part numbered items in each of a plurality of time periods;
- within each of said procedures, establishing quantities of components to be employed in respective ones of said procedures;
- providing an inventory of said components, and placing each type of component of the inventory in a separate location of a vector;
- arranging said products as variables in respective product columns of a matrix having rows and columns wherein individual ones of the rows are reserved for respective components of the products, there being a plurality of product columns with a separate column for each product type;
- establishing a material constraint for the set of components of the respective component rows by, in each of the component rows, multiplying the product variable of each column by coefficients designating the amount of each component in the product, each of the component rows corresponding to the location of an amount of component type in the vector;
- via a plurality of production constraints for said products, constraining shipments of respective ones of said product types minus the quantity of each of the respective product types produced to be less than or equal to a quantity of each of the product types in inventory;
- placing said production constraints of said product types in respective ones of additional rows of the matrix with shipments being located in separate shipment columns of the matrix and said product types being located in the respective product columns, there being a separate row for each product type having a nonzero shipment, the quantities of the product types in inventory being entered at locations of said vector corresponding to the matrix row having the production constraints;
- via a plurality of demand constraints for said products, constraining shipments of respective ones of said product types to be less than or equal to a demand for the respective product types;
- placing said demand constraints of said products in separate additional rows of said matrix with shipments being located in respective ones of said shipment columns of the matrix, the demands for said product types being located in separate locations of said vector corresponding to the respective rows of the demand constraints; and
- applying a linear programming optimization to said matrix and said vector in accordance with an objective function to obtain said optimum production quantity for each of said product types to maximize profit;
- providing a shipment schedule and a production schedule; and
- inserting the shipment schedule and the production schedule into said manufacturing information system for a manufacture of each of said product types in said optimum production quantity.

* * * * *